US011216499B2

(12) United States Patent
Yoshikawa

(10) Patent No.: US 11,216,499 B2
(45) Date of Patent: Jan. 4, 2022

(54) INFORMATION RETRIEVAL APPARATUS, INFORMATION RETRIEVAL SYSTEM, AND INFORMATION RETRIEVAL METHOD

(71) Applicant: MICWARE CO., LTD., Kobe (JP)

(72) Inventor: Sumito Yoshikawa, Kobe (JP)

(73) Assignee: MICWARE CO., LTD., Kobe (JP)

(*) Notice: Subject to any disclaimer, the term of this patent is extended or adjusted under 35 U.S.C. 154(b) by 69 days.

(21) Appl. No.: 16/286,140

(22) Filed: Feb. 26, 2019

(65) Prior Publication Data
US 2019/0266182 A1 Aug. 29, 2019

(30) Foreign Application Priority Data

Feb. 27, 2018 (JP) .............................. JP2018-033303
Jul. 20, 2018 (JP) .............................. JP2018-136981
Oct. 12, 2018 (JP) .............................. JP2018-193669

(51) Int. Cl.
*G06F 16/33* (2019.01)
*G06F 16/35* (2019.01)
(Continued)

(52) U.S. Cl.
CPC ........ *G06F 16/3344* (2019.01); *G06F 16/338* (2019.01); *G06F 16/353* (2019.01);
(Continued)

(58) Field of Classification Search
CPC .. G06F 16/3344; G06F 16/338; G06F 16/353; G06F 16/9537; G06F 40/289; G06N 20/00
See application file for complete search history.

(56) References Cited

U.S. PATENT DOCUMENTS

2012/0016678 A1* 1/2012 Gruber ................... G06N 5/041
704/275
2015/0356173 A1* 12/2015 Aikawa ................ G06F 16/334
707/722
(Continued)

FOREIGN PATENT DOCUMENTS

JP 2002-259428 A 9/2002
JP 2011-107874 A 6/2011
(Continued)

OTHER PUBLICATIONS

Beitzel, S. M., Jensen, E. C., Frieder, O., Grossman, D., Lewis, D. D., Chowdhury, A., & Kolcz, A. (Aug. 2005). Automatic web query classification using labeled and unlabeled training data. In Proceedings of the 28th annual international ACM SIGIR conference(pp. 581-582) (Year: 2005).*

(Continued)

*Primary Examiner* — Matthew Ell
*Assistant Examiner* — Lana Alagic
(74) *Attorney, Agent, or Firm* — Birch, Stewart, Kolasch & Birch, LLP

(57) ABSTRACT

An information retrieval apparatus includes a retrieval phrase acquisition device and a controller. The retrieval phrase acquisition device acquires a retrieval phrase from outside. The controller is configured to generate a feature word from the retrieval phrase. The feature word is related to a word representing a retrieval target. The controller is configured to retrieve the retrieval target corresponding to the feature word based on the feature word from an accumulation database that accumulates the feature word and the retrieval target corresponding to the feature word.

11 Claims, 12 Drawing Sheets

(51) Int. Cl.
  *G06N 20/00* (2019.01)
  *G06F 16/338* (2019.01)
  *G06F 16/9537* (2019.01)
  *G06F 40/289* (2020.01)

(52) U.S. Cl.
  CPC ........ *G06F 16/9537* (2019.01); *G06F 40/289* (2020.01); *G06N 20/00* (2019.01)

(56) References Cited

U.S. PATENT DOCUMENTS

2016/0019474 A1* 1/2016 Cheng ................ G06Q 50/14 705/5
2017/0357733 A1 12/2017 Lobo et al.

FOREIGN PATENT DOCUMENTS

| JP | 2014-191714 A | 10/2014 |
| JP | 2015-26135 A | 2/2015 |
| JP | 2016-15162 A | 1/2016 |
| JP | 2017-191357 A | 10/2017 |

OTHER PUBLICATIONS

Ikawa, Y., Enoki, M., & Tatsubori, M. (Apr. 2012). Location inference using microblog messages. In Proceedings of the 21st international conference on world wide web (pp. 687-690). (Year: 2012).*

Ogheneovo, E. E., and R. B. Japheth. "Application of vector space model to query ranking and information retrieval." (2016) International Journal of Advanced Research in Computer Science and Software Engineering 6.5. (Year: 2016).*

Extended European Search Report, dated May 17, 2019, for European Application No. 19157914.3.

European Office Acton dated Sep. 10, 2020 for Application No. 19 157 914.3.

Liddy, "How a Search Engine Works", Searcher, vol. 9, No. 5, May 2001, 5 pages.

Japanese Office Action, dated Aug. 18, 2020, for Japanese Application No. 2018-136981, with an English translation.

Japanese Notice of Reasons for Refusal for Japaneese Application No. 2018-193869, dated Sep. 14, 2021, with an English translation.

* cited by examiner

Fig.5

| CLUSTER ID | FEATURE WORD | WEIGHT | CATEGORY ID |
|---|---|---|---|
| 15 | LANDSCAPE | 0.88 | FAMOUS AND HISTORIC SITE |
| 8 | LOVELY | 0.76 | |
| 86 | INSTAGRAM (REGISTERED TRADEMARK) | 0.38 | |
| 4 | DELICIOUS | 0.98 | RESTAURANT |
| ... | ... | ... | |
| 17 | NIGHT VIEW | 0.57 | |
| 15 | SCENERY | 0.45 | |
| 8 | LOVELY | 0.33 | |
| 23 | INTERESTING | 0.29 | |
| 44 | DATING | 0.25 | |
| 23 | FUN | 0.91 | AMUSEMENT PARK |
| 44 | DATING | 0.79 | |

Fig.6

| CLUSTER ID | FEATURE WORD | WEIGHT | SPOT ID |
|---|---|---|---|
| 15 | SCENERY | 0.53 | FAMOUS SITE A |
| 8 | BEAUTIFUL | 0.46 | |
| 72 | GOOD | 0.35 | |
| 98 | PHOTOGRAPH | 0.67 | FAMOUS SITE B |
| 15 | SIGHT | 0.53 | |
| 8 | LOVELY | 0.25 | |
| 2 | COAST | 0.58 | FAMOUS SITE C |
| 65 | SURFING | 0.25 | |
| 18 | RAMEN | 0.96 | RESTAURANT D |
| 4 | DELICIOUS | 0.37 | |
| 77 | DINNER | 0.84 | RESTAURANT E |
| 17 | NIGHT VIEW | 0.69 | |
| 8 | DATING | 0.38 | |
| 23 | FUN | 0.94 | AMUSEMENT PARK F |
| 44 | DATING | 0.74 | |

INFORMATION RETRIEVAL APPARATUS, INFORMATION RETRIEVAL SYSTEM, AND INFORMATION RETRIEVAL METHOD

BACKGROUND

1. Technical Field

The present invention relates to an information retrieval apparatus, an information retrieval system, and an information retrieval method.

2. Related Art

Conventionally, there are known information retrieval apparatuses each capable of searching a map for not only data that explicitly includes coordinate information but also information included in content of atypical data in a map search (Japanese Unexamined Patent Application Publication No. 2014-191714).

In an information retrieval apparatus disclosed in Japanese Unexamined Patent Application Publication No. 2014-191714, data including a plurality of words each having an attribute is input, the plurality of words included in the data thus input are extracted, and retrieval is performed with data including attribute information converted from attribute-related words extracted from the plurality of words for each of the attributes.

For example, the information retrieval apparatus disclosed in Japanese Unexamined Patent Application Publication No. 2014-191714 can output a predetermined retrieval result based on a retrieval keyword input by a user because, in a case of the word "Hokkaido" relating to a position attribute, coordinate information of "Hokkaido" has been added to atypical data.

SUMMARY

An information retrieval apparatus according to a first aspect of the present disclosure includes a retrieval phrase acquisition device and a controller. The retrieval phrase acquisition device acquires a retrieval phrase from outside. The controller is configured to generate a feature word from the retrieval phrase. The feature word is related to a word representing a retrieval target. The controller is configured to retrieve the retrieval target corresponding to the feature word based on the feature word from an accumulation database that accumulates the feature word and the retrieval target corresponding to the feature word.

An information retrieval system according to a second aspect of the present disclosure includes an information processing terminal, an information accumulation apparatus, and an information retrieval apparatus. The information processing terminal receives a retrieval phrase. The information accumulation apparatus accumulates a feature word and a retrieval target corresponding to the feature word. The information retrieval apparatus communicates with the information processing terminal. The information retrieval apparatus includes a retrieval phrase acquisition device and a controller. The retrieval phrase acquisition device acquires the retrieval phrase from the information processing terminal. The controller is configured to generate the feature word from the retrieval phrase. The feature word is related to a word representing the retrieval target. The controller is configured to retrieve the retrieval target corresponding to the feature word from the information accumulation apparatus based on the feature word.

An information retrieval method according to a third aspect of the present disclosure includes generating a feature word from a retrieval phrase. The feature word is related to a word representing a retrieval target. The retrieval target corresponding to the feature word is retrieved based on the feature word from an accumulation database that accumulates the feature word and the retrieval target corresponding to the feature word.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a diagram showing an example of a data table stored in a category database.

FIG. 6 is a diagram showing an example of a data table stored in a spot database.

DESCRIPTION OF THE EMBODIMENTS

Figure 1:
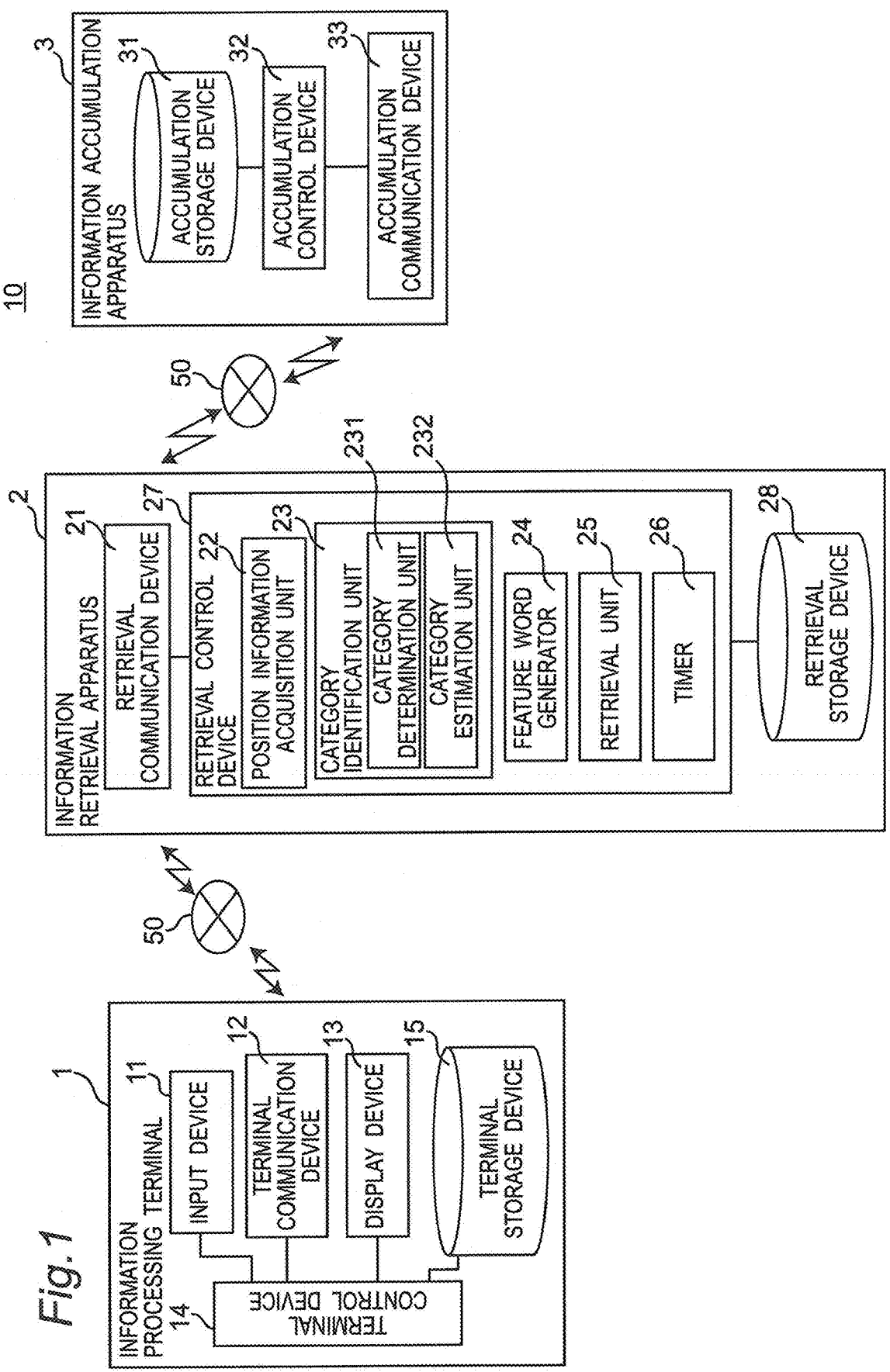
FIG. 1 is a schematic configuration diagram of an information retrieval system according to the present embodiment.

The embodiments will now be described with reference to the accompanying drawings, wherein like reference numerals designate corresponding or identical elements throughout the various drawings.

Hereinafter, an information retrieval system 10 of the present embodiment will be described. As shown in FIG. 1, the information retrieval system 10 includes an information processing terminal 1, an information retrieval apparatus 2, and an information accumulation apparatus 3. The information retrieval apparatus 2 is capable of communicating with the information processing terminal 1. The information accumulation apparatus 3 is accessible by the information retrieval apparatus 2.

The information processing terminal 1 includes an input device 11, a terminal communication device 12, and a display device 13. The input device 11 is configured such that a retrieval phrase can be input to the input device 11. The terminal communication device 12 is capable of transmitting the retrieval phrase to the information retrieval apparatus 2. The terminal communication device is capable of receiving a retrieval target retrieved based on the retrieval phrase from the information retrieval apparatus 2. The display device 13 is capable of displaying the retrieval target.

The information retrieval apparatus 2 includes a retrieval communication device (which can be regarded as a retrieval phrase acquisition device) 21, a position information acquisition unit 22, a feature word generator 24, and a retrieval unit 25. The retrieval communication device 21 is capable of receiving the retrieval phrase from the information processing terminal 1. The retrieval communication device 21 is capable of transmitting the retrieval target. The position information acquisition unit 22 is capable of acquiring position information. The position information indicates a position on a map that is a starting point of retrieval. The feature word generator 24 generates a feature word from the retrieval phrase. The feature word is related to a word representing the retrieval target. The retrieval unit 25 is capable of retrieving the retrieval target from an accumulation database.

The retrieval target has point information. The point information represents a specific point. The retrieval unit 25 is capable of retrieving the retrieval target corresponding to the feature word within a predetermined range from a position based on the position information and the feature word.

The information accumulation apparatus 3 includes an accumulation storage device 31. In the accumulation storage device 31, the accumulation database is stored. The accumulation database accumulates the feature word and the retrieval target. The retrieval target corresponds to the feature word.

The information retrieval system 10 of the present embodiment is capable of detecting a more accurate retrieval target.

Each component of the information retrieval system 10 of the present embodiment will be specifically described below.

In the information retrieval system 10 according to the present embodiment, information processing terminal used by a user is capable of communicating with information retrieval apparatus 2. The information processing terminal 1 and the information retrieval apparatus 2 are connected, for example, by wireless communication via a public communication network 50. In FIG. 1, flows of information to be communicated via the public communication network 50 are indicated by bidirectional arrows.

As shown in FIG. 1, the information processing terminal 1 includes a terminal control device 14 and a terminal storage device 15 in addition to the input device 11, the terminal communication device 12, and the display device 13. The information processing terminal 1 is a terminal apparatus used by the user. Examples of such a terminal apparatus include a feature phone and a smartphone.

The input device 11 is configured such that a retrieval phrase can be input to the input device 11. The retrieval phrase is a term used for retrieving the retrieval target. The retrieval phrase is also a term optionally selected and input by the user. The retrieval phrase may be a word, a combination of words, or a sentence including a subject and a predicate. The input device 11 is capable of making an instruction to transmit the retrieval phrase thus input from the terminal communication device 12. The input device 11 may be, for example, a touch panel integrally formed with the display device 13, a voice input device to which the retrieval phrase can be input by voice, or a physical key. The input device 11 is not limited to the configuration where the touch panel is integrally formed with the display device 13, and may include only an input unit.

The terminal communication device 12 is capable of communicating with the information retrieval apparatus 2. The terminal communication device 12 transmits information on the retrieval phrase. The terminal communication device 12 receives information on the retrieval target. Since the retrieval target has information indicating a specific point, the retrieval target is also point information. The point information is point of interest (POI) information. Specifically, the terminal communication device 12 is capable of communicating with the retrieval communication device 21 of the information retrieval apparatus 2 via the public communication network 50. The terminal communication device 12 may be capable of performing not only public communication via the public communication network 50 but also communication by wire, for example. Further, the terminal communication device 12 may be capable of performing communication by wireless compliant with a communication standard such as infrared communication, Wi-Fi (registered trademark), Bluetooth (registered trademark), or Bluetooth Low Energy (BLE).

The display device 13 is capable of displaying various types of information. The display device 13 displays, for example, the retrieval phrase. The display device 13 may display a map. The display device 13 may display a map on which a point indicated by the point information corresponding to the retrieval target retrieved by the information retrieval apparatus 2 is superimposed. For example, the display device 13 is capable of visualizing a plurality of pieces of point information and displaying a map represented by the map information stored in the terminal storage device 15 on which the plurality of pieces of point information are superimposed. The display device 13 is not limited to the configuration where the touch panel is integrally formed with the input device 11, and may include only a display unit.

The terminal control device 14 controls various information processing operations. The terminal control device 14 is electrically connected to the input device 11, the terminal communication device 12, the display device 13, and the terminal storage device 15. The terminal control device 14 is capable of controlling the input device 11, the terminal communication device 12, and the display device 13 based on a program stored in the terminal storage device 15. The terminal control device 14 includes, for example, a central processing unit (CPU) or a micro processing unit (MPU).

The terminal storage device 15 includes a volatile memory device in which information is lost when the power is interrupted, and a non-volatile memory device in which information is retained even when the power is interrupted. In the volatile memory device, information to be processed by the terminal control device 14 is temporarily stored. In the volatile memory device, map information representing a map and point information added to the map information are stored, for example. Examples of the volatile memory device include a random access memory (RAM). The non-volatile memory device is a storage capable of holding various information processing programs and various types of information. Examples of the non-volatile memory device include a read only memory (ROM). Examples of the ROM include a flash memory or a hard disk drive (HDD).

As shown in FIG. 1, the information retrieval apparatus 2 includes the retrieval communication device 21 and a retrieval control device 27. The information retrieval apparatus 2 includes a retrieval storage device 28 in addition to the retrieval communication device 21 and the retrieval control device 27. The information retrieval apparatus 2 includes, for example, a server. The retrieval control device 27 includes the position information acquisition unit 22, a category identification unit 23, the feature word generator 24, the retrieval unit 25, and a timer 26.

The retrieval communication device 21 is capable of communicating with the information processing terminal 1. The retrieval communication device 21 is capable of receiving the information on the retrieval phrase from the information processing terminal 1 (the retrieval communication device 21 is an embodiment of the retrieval phrase acquisition device that acquires the retrieval phrase from outside). The retrieval communication device is capable of transmitting the information on the retrieval target retrieved by the retrieval control device 27 to the information processing terminal 1. That is, the retrieval communication device 21 receives the information on the retrieval phrase. The retrieval communication device 21 transmits the information on the retrieval target. Specifically, the retrieval communication device 21 is capable of communicating with the terminal communication device 12 of the information processing terminal 1 via the public communication network 50.

Further, the retrieval communication device 21 is capable of communicating with the information accumulation apparatus 3. The retrieval communication device 21 transmits information for retrieving the retrieval target. The retrieval communication device 21 receives, from the information accumulation apparatus 3, the information on the retrieval target retrieved. Specifically, the retrieval communication device 21 is capable of communicating with the accumulation communication device 33 of the information accumulation apparatus 3 via the public communication network 50. The retrieval communication device 21 may be capable of performing not only public communication via the public communication network 50 but also communication by wire, for example. Further, the terminal communication device 12 may be capable of performing communication by wireless compliant with a communication standard such as infrared communication, Wi-Fi (registered trademark), Bluetooth (registered trademark), or BLE.

The retrieval control device 27 is electrically connected to the retrieval communication device 21 and the retrieval storage device 28. The retrieval control device is configured to enable the position information acquisition unit 22, the category identification unit 23, the feature word generator 24, the retrieval unit 25, and the timer 26 to work. For example, the retrieval control device 27 is activated to execute a position information acquisition program, a category identification program, a feature word generation program, a retrieval program, and a timer program stored in the retrieval storage device 28. The retrieval control device 27 includes, for example, a CPU or an MPU.

The position information acquisition program is executed on a computer to function as the position information acquisition unit 22 that acquires the position information. The category identification program is executed on the computer to function as the category identification unit 23 that identifies a category of the retrieval phrase. The feature word generation program is executed on the computer to function as the feature word generator 24 that generates the feature word from the retrieval phrase. The retrieval program is executed on the computer to function as the retrieval unit 25 that retrieves the retrieval target from the accumulation database stored in the information accumulation apparatus 3. The timer program is executed on the computer to function as the timer 26 capable of clocking a time in a year, month, day, and hour format.

The position information acquisition unit 22 acquires the position information. The position information includes, for example, longitude information and latitude information. The position information may include altitude information in addition to the longitude information and the latitude information. The position information acquisition unit 22 is capable of acquiring position information transmitted from the information processing terminal 1, for example. Examples of the position information transmitted from the information processing terminal 1 include position information input through the input device 11 of the information processing terminal 1. The position information acquisition unit 22 is further capable of acquiring the position information from the retrieval phrase transmitted from the information processing terminal 1.

The retrieval phrase includes text data. The retrieval phrase includes a phrase. The phrase may be a single word or a group of a plurality of words. The phrase may be a sentence. The retrieval phrase is converted from text data into a format that can be mechanically handled. The retrieval phrase is decomposed into a plurality of words by morphological analysis. Herein, the morphological analysis allows the retrieval phrase to be classified into smallest units each having a meaning in a natural language. The morphological analysis allows acquisition of part-of-speech information on classified morphemes. The morphological analysis also allows acquisition of, for example, information on whether a word included in the retrieval phrase is a noun, an adjective, a verb, or an adverb.

For the morphological analysis, for example, a morphological analysis engine such as MeCab may be used. MeCab may be used together with a named entity dictionary. Examples of the named entity dictionary include a system dictionary such as Neologd. In order to acquire a word included in the retrieval phrase, the position information acquisition unit 22 performs the morphological analysis on the retrieval phrase. The position information acquisition unit 22 is not limited to the configuration where the morphological analysis is performed on the retrieval phrase in order to acquire a word included in the retrieval phrase. For example, the position information acquisition unit 22 may acquire a word that is a result of the morphological analysis performed on the retrieval phrase by the category identification unit 23, the feature word generator 24, the retrieval unit 25, or a morphological analysis unit (not shown). The position information acquisition unit 22 may convert a word that is a result of the morphological analysis into a distributed representation, i.e. a numerical form of the word. The position information acquisition unit 22 may make a group of inflected forms of a word that is a result of the morphological analysis. For example, fastText may be used to make a group of inflected forms of a word that is a result of the morphological analysis.

When a word included in the retrieval phrase is a place name, the position information acquisition unit 22 can acquire position information from a place name database in which a place name and position information are associated with each other. For example, the position information acquisition unit 22 compares a word that results from decomposing the retrieval phrase by the morphological analysis with the place name database stored in the retrieval storage device 28. When the word that results from decomposing the retrieval phrase by the morphological analysis matches a place name in the place name database, the position information acquisition unit 22 may acquire position information associated with the matching place name.

For example, the place name database may include a name of a prefecture, city, district, town, village, or facility, that is associated with position information. Herein, the place name includes not only a name representing a municipality, but also a name of a facility. In other words, the place name is a name indicating geographical information. In the place name database, for example, a name of a prefecture and a position information on an office of the prefecture, a name of a city and position information of an office of the city, a name of a district and position information of an office of the district, a name of a town and position information of an office of the town, a name of a village and position information of an office of the village, a name of a facility and position information of the facility are individually associated with each other. Hereinafter, when a word included in the retrieval phrase is a place name, acquisition of the position information from the place name database in which the place name and the position information are directly associated with each other is referred to as acquisition of the position information on a non-machine learning basis. When acquiring the position information on the non-machine learning basis, the position information acquisition unit 22 performs hard retrieval as to whether the word included in the retrieval phrase matches a word included in a database.

When a word included in the retrieval phrase does not include a place name, the position information acquisition unit 22 can acquire position information from a database in which a retrieval word and position information are associated with each other on a machine learning basis. The position information acquisition unit 22 replaces a word that results from decomposing the retrieval phrase by the morphological analysis with a retrieval word having a high degree of similarity on the machine learning basis, for example. For example, the position information acquisition unit 22 can select a desired retrieval word based on a degree of similarity between a word stored in advance and a retrieval word after performing the morphological analysis on the retrieval phrase. The position information acquisition unit 22 compares the retrieval word with the place name database in which the retrieval word and the position information are associated with each other. When the retrieval word matches the place name in the place name database, the position information acquisition unit 22 may acquire the position information associated with the matching place name. In other words, the position information acquisition unit 22 uses a geocoding technique to convert the place name indicating geographical information to a coordinate value of longitude and latitude.

The position information acquisition unit 22 can use at least one of position information from the information processing terminal 1, a word representing a place name included in the retrieval phrase from the information processing terminal 1, and a retrieval word based on the retrieval phrase from the information processing terminal 1 to acquire position information indicating a position on the map. Using such information from the information processing terminal 1, the position information acquisition unit 22 acquires the position information indicating a position on the map. The information retrieval apparatus 2 according to the present embodiment can indirectly acquire the position information even when the information retrieval apparatus 2 cannot directly acquire the position information from the information processing terminal 1. The information retrieval apparatus 2 can acquire the position information with a low processing load as compared with the configuration where the position information is acquired only on the machine learning basis.

That is, in the information retrieval apparatus 2 according to the present embodiment, the position information acquisition unit 22 acquires the position information. The position information is estimated from a word included in the retrieval phrase on the machine learning basis.

The information retrieval apparatus 2 according to the present embodiment can indirectly estimate the position information from a word included in the retrieval phrase on the machine learning basis even when the retrieval phrase does not include any word directly indicating the position information.

The category identification unit 23 is capable of identifying a category of the retrieval phrase. The category identification unit 23 identifies the category of the retrieval phrase transmitted from the information processing terminal 1. Examples of the category include a hot spring, a park, a museum, a shrine, a concert, shopping, amusement, outdoor, an event, gourmet, ramen, a mountain. The category is classified into appropriate types. The number of category types may be, for example, 300.

The category identification unit 23 performs the morphological analysis on the retrieval phrase. The category identification unit 23 is not limited only to the configuration where the morphological analysis is performed on the retrieval phrase in order to acquire a word included in the retrieval phrase. For example, the category identification unit 23 may be configured to acquire a word that is a result of the morphological analysis performed on the retrieval phrase by the position information acquisition unit 22, the feature word generator 24, the retrieval unit 25, or the morphological analysis unit (not shown). The category identification unit 23 may convert a word that is a result of the morphological analysis into a distributed representation, i.e. a numerical form of the word. The category identification unit 23 may make a group of inflected forms of a word that is a result of the morphological analysis.

When a word included in the retrieval phrase is a category name representing a category, the category identification unit 23 can directly identify the category from a category database in which a category name and a word are associated with each other. For example, the category identification unit 23 compares a word that results from decomposing the retrieval phrase by the morphological analysis with the category database stored in the retrieval storage device 28. When the word that results from decomposing the retrieval phrase by the morphological analysis matches a category name in the category database, the category identification unit 23 may store the matching category name in the retrieval storage device 28 in such a manner that the category name is associated with the retrieval phrase. Hereinafter, in a case where a word included in the retrieval phrase is a category name, identification of a category from the category database is referred to as category identification. That is, in a case where a word included in the retrieval phrase is determined to be a category name by the category identification, it can be said that the category identification unit 23 includes a category identification unit 231 that identifies a category from the category database on the non-machine learning basis.

When a word included in the retrieval phrase does not include any category name, the category identification unit 23 can estimate, on the machine learning basis, a category from the category database in which a retrieval word and a category name are associated with each other. The category identification unit 23 replaces a word that results from decomposing the retrieval phrase by the morphological analysis with a retrieval word having a high degree of similarity to the word on the machine learning basis, for example. In this case, the category identification unit 23 may replace one of words that result from decomposing the retrieval phrase by the morphological analysis with a retrieval word having a high degree of similarity to the word, or replace two or more words with retrieval words having a high degree of similarity to the words. Further, for example, the category identification unit 23 may extract a co-occurrence word that co-occurs from two or more words and replace the co-occurrence word with a retrieval word having a high degree of similarity to a word clustered in advance by each category. Herein, co-occurrence means that a predetermined word included in the retrieval phrase appears together with a different word in the retrieval phrase or the like. The co-occurrence word is a word that is different from the predetermined word and appears together with the predetermined word. Since categories often have different words to be used for classification, it is preferable that category identification unit 23 performs the category identification on the machine learning basis using training data in which an output in response to an input is specified in advance.

For example, the category identification unit 23 can perform the morphological analysis on the retrieval phrase and then select a desired retrieval word based on a degree of similarity between a word stored in advance and a co-occurrence word. The desired retrieval word is defined to match the category name. The category identification unit 23 compares the retrieval word that matches the category name with the category database. When the retrieval word matches the category name in the category database, the category identification unit 23 may estimate that the matching category name is a category of the retrieval phrase. That is, in a case where the retrieval word similar to a word included in the retrieval phrase is determined to be a category name by the category estimation, it can be said that the category identification unit 23 includes a category estimation unit 232 that estimates a category from the category database on the machine learning basis.

The category identification unit 23 can use a word indicating a category included in the retrieval phrase from the information processing terminal 1 or a retrieval word based on a word included in the retrieval phrase from the information processing terminal 1 to identify a category.

The information retrieval apparatus 2 according to the present embodiment can indirectly identify a category based on a word included in the retrieval phrase even when the category cannot be directly identified from the retrieval phrase. The information retrieval apparatus 2 can identify the category on the machine learning basis more accurately than on the non-machine learning basis.

In other words, the information retrieval apparatus 2 according to the present embodiment further includes the category identification unit 23 and the retrieval storage device 28. The category identification unit 23 identifies the category of the retrieval phrase. In the retrieval storage device 28, a word corresponding to the category is stored. The category identification unit 23 includes the category identification unit 231 and the category estimation unit 232. The category identification unit 231 identifies the category based on whether a word included in the retrieval phrase matches a word stored in advance in the retrieval storage device 28. The category estimation unit 232 estimates, on the machine learning basis, the category from a word included in the retrieval phrase whose category has not been identified by the category identification unit 231.

The information retrieval apparatus 2 according to the present embodiment can estimate the category indirectly from a word included in the retrieval phrase on the machine learning basis even when the retrieval phrase does not include any word directly indicating the category. The configuration where the information retrieval apparatus 2 includes the category identification unit 231 and the category estimation unit 232 allows the category to be identified with a low processing load as compared with the configuration where the category is identified only on the machine learning basis.

The feature word generator 24 is capable of generating a feature word related to a word representing the retrieval target. The feature word generator 24 generates the feature word from the retrieval phrase transmitted from the information processing terminal 1. The feature word generator 24 performs the morphological analysis on the retrieval phrase to generate the feature word from the retrieval phrase. For example, the feature word generator 24 may be configured to acquire a word that is a result of the morphological analysis performed on the retrieval phrase by the position information acquisition unit 22, the category identification unit 23, the retrieval unit 25, or the morphological analysis unit (not shown) and to generate the feature word. The feature word generator 24 converts a word that is a result of the morphological analysis into a distributed representation, i.e. a numerical form of the word. The feature word generator 24 makes a group of inflected forms of a word that is a result of the morphological analysis. Note that the "feature word" may be one word or a group of a plurality of words. Further, "generating a feature word" includes determining a feature word or selecting a feature word.

The feature word generator 24 replaces a word that results from decomposing the retrieval phrase by the morphological analysis with a feature word having a high degree of similarity to the word on the machine learning basis, for example. The feature word generator 24 may replace one of words that result from decomposing the retrieval phrase by the morphological analysis with a feature word having a high degree of similarity to the word, or replace two or more words with feature words having a high degree of similarity to the two or more words. The feature word generator 24 generates a feature word having a higher degree of similarity to a word representing the retrieval target from a word included in the retrieval phrase on the machine learning basis. For example, the feature word generator 24 can perform the morphological analysis on the retrieval phrase and then select a desired feature word based on a degree of similarity between a word stored in advance and the feature word. More specifically, the feature word generator 24 can measure a feature vector of the feature word by cosine similarity to determine how far away the feature vector is. That is, the feature word generator 24 can measure the feature vector of the feature word by cosine similarity to determine a degree of similarity.

The feature vector can be obtained based on an algorithm such as word2vec using data that results from converting a word that is a result of the morphological analysis into a numerical form as the input data, for example. The algorithm such as word2vec used herein is pre-trained by machine learning so as to be able to output a feature vector of an input word. For cosine similarity, a cosine between two vectors is calculated, and a value of the cosine is taken as a degree of similarity. The cosine similarity represents how angles of the vectors are close to each other, and the closer the cosine similarity is to 1, the closer the vectors are to each other. The closer the cosine similarity is to 0, the more distant the vectors are from each other. The feature word generator 24 may calculate statistical data of retrieval phrases based on a degree of similarity. It is preferable that the feature word generator 24 be configured to output preferentially a feature word having a higher appearance frequency out of a plurality of feature words based on the statistical data.

The feature word generator 24 extracts a co-occurrence word from words included in the retrieval phrase. In this case, the feature word generator 24 may use the co-occurrence word as a feature word, and the retrieval unit 25 may retrieve the retrieval target based on the feature word. The use of a co-occurrence word by the feature word generator 24 allows even a word that is seemingly meaningless to represent the retrieval target and is not correlated with the retrieval target to effectively derive the retrieval target. In other words, the feature word generator 24 generates a feature word having a feature vector that represents the retrieval target more faithfully from the feature vector on the machine learning basis.

That is, the feature word generator 24 generates, from the retrieval phrase, a feature word related to a word representing the retrieval target. In the information retrieval apparatus 2 according to the present embodiment, the feature word generator 24 generates a feature word having a higher degree of similarity to a word representing the retrieval target from a word including a noun, an adjective, a verb, and an adverb in the retrieval phrase.

The information retrieval apparatus 2 can detect a more accurate retrieval target by generating a feature word having a higher degree of similarity to a word representing the retrieval target. In particular, in a case where a word included in the retrieval phrase is an adjective, the information retrieval apparatus 2 generates a feature word from at least a word including the adjective, which allows a retrieval target including a subjective or emotional expression to be retrieved.

The retrieval unit 25 is capable of retrieving the retrieval target from the accumulation database. In the accumulation database, the feature word is classified by category. The retrieval target includes point information indicating a specific point. The specific point represents a position of the retrieval target on the map. The point information includes, for example, longitude information and latitude information. The point information may include altitude information in addition to the longitude information and the latitude information. The retrieval unit 25 acquires the position information from the position information acquisition unit 22. The retrieval unit 25 acquires information on a category from the category identification unit 23. The retrieval unit 25 acquires a feature word from the feature word generator 24. The retrieval unit 25 retrieves the retrieval target from the accumulation database based on the position information, the category, and the feature word. The retrieval target retrieved by the retrieval unit 25 corresponds to the feature word within a predetermined range from the position indicated by the position information and of the category identified. In other words, the retrieval unit 25 is capable of retrieving the retrieval target corresponding to the feature word within the predetermined range from the position indicated by the position information and of the category identified, based on the position information, the category, and the feature word.

The timer 26 is capable of clocking a time in a year, day, and hour format. For example, the timer 26 may be capable of clocking a time by counting the number of clocks of the CPU. The timer 26 can specify, for example, the date and time when the retrieval communication device receives the retrieval phrase from the information processing terminal 1. The timer 26 allows retrieval phrases received by the retrieval communication device 21 to be distinguished from each other by predetermined period. The timer 26 can associate the date and time when the retrieval phrase is received with the statistical data, and store the date and time together with the statistical data in the retrieval storage device 28.

The retrieval storage device 28 includes a volatile memory device in which information is lost when the power is interrupted, and a non-volatile memory device in which information is retained even when the power is interrupted. In the volatile memory device, information to be processed by the retrieval control device 27 is temporarily stored. Examples of the volatile memory device include a RAM.

The non-volatile memory device is a storage capable of holding the position information acquisition program, the category identification program, the feature word generation program, the retrieval program, and the timer program. Examples of the non-volatile memory device include a ROM. In the non-volatile memory device, the place name database, the category database, the statistical data, or the system dictionary may be stored.

In the information retrieval system 10 according to the present embodiment, for example, when content of the retrieval phrase is "a restaurant with a beautiful night view", the feature word generator 24 performs the morphological analysis on the retrieval phrase to acquire words of "night view", "beautiful", and "restaurant". The feature word generator 24 determines a degree of similarity of a feature word co-occurring with "night view", "beautiful", or "restaurant" on the machine learning basis, and then, based on the feature word thus determined, the retrieval unit 25 can retrieve, from the accumulation database, position information on "restaurant" that is an ambiguous retrieval target.

The information accumulation apparatus 3 includes an accumulation control device 32 and the accumulation communication device 33 in addition to the accumulation storage device 31. The information accumulation apparatus 3 is, for example, a database server.

In the accumulation storage device 31, the accumulation database in which a retrieval target to be retrieved by the information retrieval apparatus 2 is accumulated is stored. In the accumulation database, the retrieval target is classified by category. In the accumulation database, the retrieval target is accumulated to be associated with a feature word.

The accumulation storage device 31 includes a volatile memory device in which information is lost when the power is interrupted, and a non-volatile memory device in which information is retained even when the power is interrupted. In the volatile memory device, information to be processed by the accumulation control device 32 is temporarily stored. Examples of the volatile memory device include a RAM. The non-volatile memory device is a storage capable of holding various information processing programs and various types of information. Examples of the non-volatile memory device include a ROM. In the non-volatile memory device, the accumulation database is stored. In the non-volatile memory device, map information representing a map and point information added to the map information may be stored.

The accumulation control device 32 is electrically connected to the accumulation storage device and the accumulation communication device 33. The accumulation control device 32 is capable of controlling the accumulation storage device 31 and the accumulation communication device 33. The accumulation control device 32 may include a CPU or an MPU. The accumulation control device 32 is capable of executing a predetermined program based on a program stored in the accumulation storage device 31 in advance, for example.

The accumulation communication device 33 is accessible by the information retrieval apparatus 2. The accumulation communication device 33 is capable of receiving information for retrieving the retrieval target from the information retrieval apparatus 2. The accumulation communication device 33 is capable of transmitting information on the retrieval target to the information retrieval apparatus 2.

Further, the information accumulation apparatus 3 may be capable of constructing the accumulation database from a social networking service (SNS) provided by an external information processing apparatus (not shown). As with the configuration where the information retrieval apparatus 2 generates feature words from retrieval phrases, the information accumulation apparatus 3 can construct the accumulation database from generated feature words based on information on posted articles released to the public by the external information processing apparatus. Examples of the information on the posted articles include information on an article posted by a user to the external information processing apparatus.

Next, an overall operation of the information retrieval system 10 according to the present embodiment will be described.

First, a relation between the information processing terminal 1 and the information retrieval apparatus 2 will be described. In the information retrieval system 10 according to the present embodiment, the user inputs a retrieval phrase via the input device 11 of the information processing terminal 1. Upon an instruction to transmit the retrieval phrase being received by the input device 11, the information processing terminal transmits the retrieval phrase from the terminal communication device 12 to the information retrieval apparatus 2.

Further, upon a position on a map displayed on the display device 13 being selected by the user, the information processing terminal 1 may transmit position information indicating the position thus selected from the terminal communication device 12 to the information retrieval apparatus 2. In the information retrieval apparatus 2, in a case where the position information is received from the information processing terminal 1, the position information can be used as a starting point of retrieval on the map.

Next, an operation of the information retrieval apparatus 2 that has received the retrieval phrase from the information processing terminal 1 will be described with reference to FIG. 2. In the following description, each step in the drawings is denoted by S.

Figure 2:
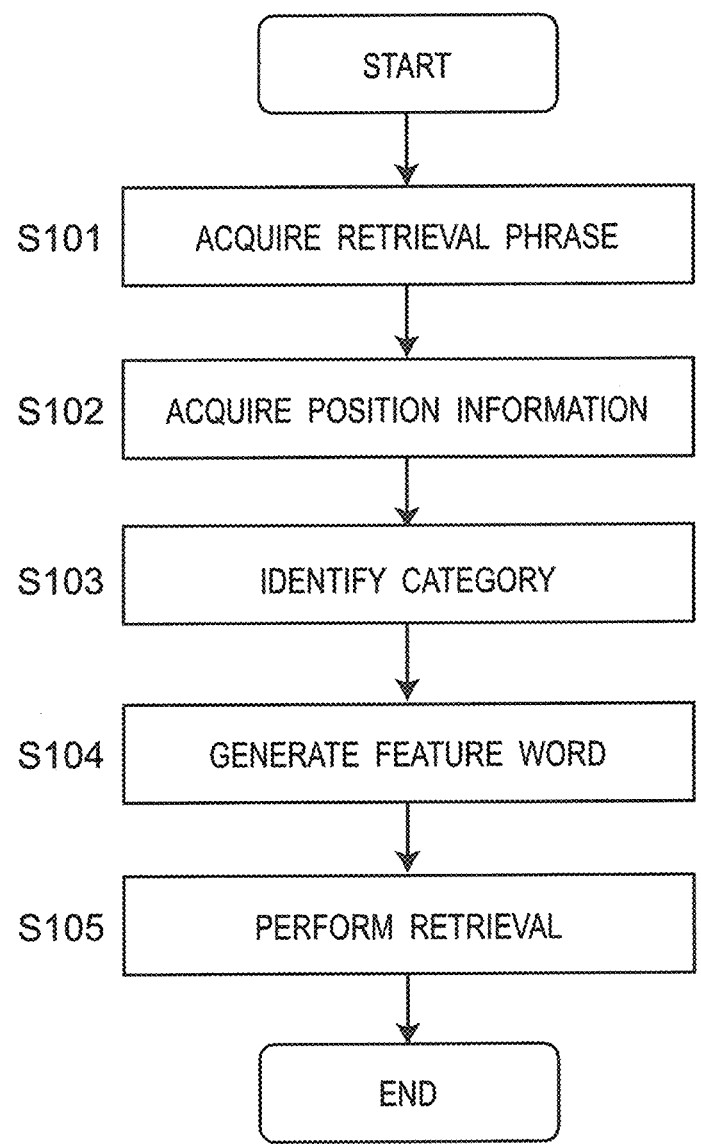
FIG. 2 is a flowchart showing a processing operation of the information retrieval system according to the present embodiment.

In the flowchart shown in FIG. 2, among processes performed by the information retrieval apparatus 2, the information retrieval apparatus 2 receives a retrieval phrase from the information processing terminal 1 (S101). The information retrieval apparatus 2 stores the retrieval phrase thus received in the retrieval storage device 28.

The information retrieval apparatus 2 performs a position information acquisition process of acquiring position information in accordance with the position information acquisition program that is executed and controlled by the retrieval control device 27 (S102). In the position information acquisition process, when the position information is transmitted from the information processing terminal 1, the position information acquisition program acquires the position information. In the position information acquisition process, when no position information to be acquired is present, the position information acquisition program acquires position information from the retrieval phrase.

Next, the information retrieval apparatus 2 performs a category identification process of identifying a category of the retrieval phrase in accordance with the category identification program executed and controlled by the retrieval control device 27 (S103). When the retrieval phrase includes a word representing a place name, the category identification program identifies a category name from the category database. When the retrieval phrase does not include any word representing a place name, the category identification program generates retrieval words from the retrieval phrase on the machine learning basis. The category identification program estimates the category name from the category database based on a retrieval word having a higher degree of similarity among the retrieval words thus generated.

Subsequently, the information retrieval apparatus 2 performs a feature word generation process of generating a feature word related to a word representing the retrieval target from the retrieval phrase in accordance with the feature word generation program executed and controlled by the retrieval control device 27 (S104).

Next, the information retrieval apparatus 2 performs a retrieval execution process of retrieving the retrieval target from the accumulation database in accordance with the retrieval program executed and controlled by the retrieval control device 27 (S105).

Finally, when succeeding in retrieving the retrieval target, the information retrieval apparatus 2 may bring the process to an end.

According to the information retrieval system 10 of the present embodiment, even when the user inputs a retrieval phrase based on an ambiguous image to the information processing terminal 1, the information retrieval apparatus 2 can perform soft retrieval based on the user's subjective word or emotional word. For example, even when a retrieval phrase, "super-spicy ramen" is input, the information retrieval apparatus 2 can cause the display device 13 of the information processing terminal 1 to display a position where a shop that possibly provides super-spicy ramen is located on a map displayed on the display device 13 with a marker whose color corresponds to the category of ramen.

That is, in the information retrieval system 10 of the present embodiment, the information processing terminal 1 further includes the terminal storage device 15. In the terminal storage device 15, map information is stored. The display device 13 displays a specific point indicating the retrieval target on the map represented by the map information.

The information retrieval system 10 of the present embodiment can cause a more accurate point corresponding to the retrieval target to be displayed on the map.

In the information retrieval system 10 of the present embodiment, the feature word generator 24 calculates statistical data of retrieval phrases. The information accumulation apparatus 3 stores the retrieval phrases received by the retrieval communication device 21 from the information processing terminal 1 within a preset period and the statistical data in the accumulation database with the retrieval phrases and the statistical data associated with each other.

The information retrieval system 10 of the present embodiment can detect a more accurate retrieval target based on the retrieval phrases received within the preset period.

Furthermore, in the information retrieval system 10 of the present embodiment, the feature word generator 24 generates a feature word having a higher degree of similarity to a word representing the retrieval target from words included in the retrieval phrase. The feature word generator 24 is configured to preferentially output a feature word having a higher appearance frequency based on the statistical data.

The information retrieval system 10 of the present embodiment can detect a more accurate retrieval target.

Note that, in the information retrieval system 10 of the embodiment, for example, with a configuration where the information processing terminal 1 includes a touch panel, the information processing terminal 1 allows a user to tap on a place where the user wants to designate as a retrieval area by enlarging or reducing the map displayed on the display device 13 to input the position information to the input device 11.

Further, the information processing terminal 1 causes the display device 13 to display the retrieval target as a marker on the map. Examples of the marker include a balloon at the center of which a pictogram representing a category is displayed. For example, the information processing terminal 1 may cause the display device 13 to display the map including markers that have different colors or different shades for each category. For example, the information processing terminal 1 may cause the display device 13 to display the map including markers that vary in size in a manner that depends on a degree of similarity between a word included in the retrieval phrase and a feature word.

Furthermore, in the information retrieval system 10 of the embodiment, the information processing terminal 1 may have a navigation function. The configuration where the information processing terminal 1 has the navigation function makes it possible to guide the user to the point information on the map displayed on the display device 13. The navigation function is stored in the terminal storage device 15 of the information processing terminal 1 and is controlled by the terminal control device 14. The navigation function may be stored in the retrieval storage device 28 of the information retrieval apparatus 2 and controlled by the retrieval control device 27. In the information retrieval system 10, the navigation function may be implemented in either the information processing terminal 1 or the information retrieval apparatus 2 as long as map and navigation displays can be shown on the display device 13 of the information processing terminal 1.

Specifically, the navigation function may be stored in one of the information retrieval apparatus 2 and the information processing terminal 1, and the navigation function may be controlled by the other one of them. Alternatively, another configuration may be employed in which the navigation function is divided and stored in both the information retrieval apparatus 2 and the information processing terminal 1, and one of them controls the navigation function or both of them cooperate to control the navigation function.

Each of the processes or each of the functions of the embodiment may be implemented via centralized processing performed by a single apparatus or a single system or may be implemented via distributed processing performed by a plurality of apparatuses or a plurality of systems. Further, each of the components of the embodiment may be constituted by dedicated hardware. Some of the components of the embodiment that can be implemented via software may be implemented via program execution.

Each of the components of the embodiment may be implemented, for example, by a CPU executing a program of software recorded in a recording medium. The program may be downloaded from a server for execution, or the program recorded in a predetermined recording medium may be read out for execution. Further, the computer that executes the program may be a single computer or a plurality of computers. The embodiment may be configured to perform centralized processing or may be configured to perform distributed processing.

Note that the present invention can be implemented in various other forms without departing from its spirit, gist or main features. The embodiment is merely illustrative in all respects, and should not be interpreted restrictively. That is, taking the embodiment as an example, the present invention is an information retrieval apparatus or an information retrieval system.

Summary of Embodiment (1: About Feature Word)

According to the information retrieval apparatus 2 described above, even when a retrieval phrase input by the user performing the retrieval does not directly indicate a spot which the user wants to retrieve, a function of each part included in the retrieval control device 27 can detect an appropriate spot and present the spot to the user. Herein, the spot is also a retrieval target.

More specifically, the retrieval control device 27 includes the feature word generator 24 and the retrieval unit 25. The feature word generator 24 generates a feature word from a word that results from performing the morphological analysis on the retrieval phrase.

Hereinafter, the word that results from performing the morphological analysis on the retrieval phrase may be referred to as an input word. In this specification, the term "generation" is used as "specification", "determination", "detection", or "selection" for a feature word.

Herein, the feature word generated by the feature word generator 24 may be a similar word having a high degree of similarity to the input word, or may be a co-occurrence word of the input word. The feature word generated by the feature word generator 24 may be both a similar word and a co-occurrence word. In the following description, a word having a degree of similarity to the input word that is greater than a predetermined threshold value may be referred to as a similar word.

When the similar word is used as the feature word, the feature word generator 24 generates feature information indicating a feature of the input word. The feature information may be any information as long as the information indicates the feature of the input word. The feature information may be, for example, a feature vector of the input word. The feature vector can be calculated based on an algorithm such as GloVe, WordNet, or fastText as well as word2vec. The feature word generator 24 calculates a degree of similarity between the feature vector of each feature word associated with a spot in the accumulation database and the feature vector thus calculated and specifies a word having a degree of similarity equal to or greater than the threshold value. As a result, the feature word generator 24 can identify a similar word similar to the input word among the feature words associated with the spot in the accumulation database. The method of calculating a degree of similarity is not particularly limited, and a degree of similarity can be calculated, for example, by cosine similarity.

When a co-occurrence word is used as the feature word, the feature word generator 24 specifies a co-occurrence word of the input word. The co-occurrence word can be extracted by, for example, term frequency-inverse document frequency (TF-IDF). Further, the feature word generator 24 may use a co-occurrence word of a similar word as the feature word.

Then, the retrieval unit 25 searches the accumulation database stored in the accumulation storage device 31 using the feature word thus generated. The retrieval unit 25 searches the accumulation database to detect the spot associated with the feature word in the accumulation database. Note that "spot" means, for example, a point or place, or a building located at a specific point or place. In the accumulation database, each spot is associated with position information indicating the geographical position of the spot. Since the feature word used for retrieval is a similar word or a co-occurrence word of the input word, even if the retrieval phrase does not directly indicate a spot which the user wants to retrieve, it is possible to detect an appropriate spot and present the spot to the user.

Note that the feature word generator 24 may use, for the feature word generation, a word of a predetermined part of speech out of words that result from performing the morphological analysis on the retrieval phrase. Examples of the predetermined part of speech include a noun, an adjective, a verb, and an adverb. This makes it possible to exclude parts of speech such as a conjunction, an interjection, a particle, and an auxiliary verb from which it is difficult to generate a significant feature word, and to generate an appropriate feature word.

(2: About Position Information)

The retrieval control device 27 may include the position information acquisition unit 22. The position information acquisition unit 22 acquires, based on information received from the information processing terminal 1 used by the user, position information serving as a reference for determining a retrieval range of a spot. The retrieval unit 25 sets a predetermined range based on a position indicated by the position information thus acquired, and detects the spot within the range thus set. This allows the information retrieval system 10 to perform the retrieval of the spot within a range narrowed down to an area of interest to the user performing the retrieval.

The position information acquisition unit 22 may acquire the position information from words that result from performing the morphological analysis on the retrieval phrase. For example, when a word indicating a position is included in the words that result from performing the morphological analysis on the retrieval phrase, the position information acquisition unit 22 may acquire the position information using the place name database in which a word indicating a position and position information are associated with each other. Examples of the word indicating a position include a place name.

Further, the position information acquisition unit 22 may acquire the position information using a position information database for specifying position information. The position information database is a database in which a word and position information indicating a position corresponding to the word are associated with each other. When acquiring the position information using the position information database, the position information acquisition unit 22 searches the position information database using at least one of a word that results from performing the morphological analysis on the retrieval phrase, a similar word of the word, and a co-occurrence word of the word. This allows the position information acquisition unit 22 to acquire the position information related to the word that results from performing the morphological analysis on the retrieval phrase. Note that such a similar word and co-occurrence word may be specified by using a model pre-trained by machine learning. In this case, the position information acquisition unit 22 acquires the position information estimated on the machine learning basis from a word included in the retrieval phrase.

Further, the information processing terminal 1 may acquire position information indicating a position of the information processing terminal 1 itself using, for example, the global positioning system (GPS), and transmit the position information thus acquired to the information retrieval apparatus 2. In this case, the position information acquisition unit 22 may acquire the position information that is acquired based on the GPS and transmitted from the information processing terminal 1. The information retrieval system 10 can also detect a spot around the current location of the information processing terminal 1 using the position information acquired based on the GPS.

(3: About Category)

The retrieval control device 27 may include the category identification unit 23. The category identification unit 23 may include the category identification unit 231 and the category estimation unit 232. The category identification unit 23 identifies a category of a word that results from performing the morphological analysis on the retrieval phrase. In this case, each spot is associated with a corresponding category in the accumulation database. This allows the retrieval unit 25 to detect a spot belonging to a category identified by the category identification unit 23 among spots corresponding to the retrieval phrase.

For example, the category identification unit 231 can identify a category corresponding to a word that results from performing the morphological analysis on the retrieval phrase by using the category database in which a word and a category corresponding to the word are associated with each other.

The category estimation unit 232 specifies a category corresponding to a word that results from performing the morphological analysis on the retrieval phrase based on an algorithm pre-trained by machine learning. The above algorithm may be, for example, an algorithm that results from performing machine learning on correspondences between feature information on a word and a category. The feature information on a word is, for example, a feature vector. In a case where the algorithm that results from performing machine learning on the correspondences between the feature information on a word and a category is used, the category estimation unit 232 acquires the feature information on a word that results from performing the morphological analysis on the retrieval phrase, and gives the feature information thus acquired to the above algorithm to specify a category. The category estimation unit 232 may specify at least one of a similar word of a word that results from performing the morphological analysis on the retrieval phrase and a co-occurrence word of the word that results from performing the morphological analysis on the retrieval phrase. The category estimation unit 232 may specify a category by searching the category database using at least one of the similar word and the co-occurrence word thus specified. Note that such a similar word and co-occurrence word may be specified by using a model pre-trained by machine learning. In this case, the category estimation unit 232 estimates the category from words included in the retrieval phrase on the machine learning basis. Further, for example, the category estimation unit 232 may calculate a degree of similarity between a feature vector of a word belonging to a certain category and a feature vector of a word that results from performing the morphological analysis on the retrieval phrase. In this case, when the degree of similarity thus calculated is equal to or greater than the predetermined threshold value, the category estimation unit 232 determines that the word that results from performing the morphological analysis on the retrieval phrase belongs to the certain category.

The category thus determined may be used for weighting (to be described later). The determined category may be used to narrow down the retrieval range of the retrieval unit 25. When the determined category is used to narrow down the retrieval range, the retrieval unit 25 detects a spot associated with a feature word generated by the feature word generator 24 from spots to be retrieved, the spots belonging to the category determined by the category identification unit 23 among spots stored in the accumulation database. For example, assume that the category identification unit 23 identifies a category of a word "landscape" included in the retrieval phrase as being "sightseeing spot". In this case, the retrieval unit 25 retrieves a spot associated with the category "sightseeing spot" among the spots stored in the accumulation database based on a feature word generated from "landscape". This allows the information retrieval system 10 to appropriately narrow down the retrieval range and quickly obtain an appropriate retrieval result.

(4: About Priority in Retrieval)

In a case where the feature word generator 24 is capable of generating a plurality of feature words, the feature word generator 24 may generate only a feature word having a higher priority among the plurality of feature words. For example, in the information retrieval system 10, the priority may correspond to at least one of a cumulative number of uses for past retrieval, a use frequency for past retrieval within a predetermined period, and a rank obtained based on either or both of the cumulative number and the use frequency. For example, in a case where "view" and "restaurant" can be generated as feature words, the feature word generator 24 determines "restaurant" to be a feature word when a retrieval frequency of "restaurant" over the most recent week is higher than a retrieval frequency of "view" over the most recent week.

Note that the feature word generator 24 may calculate information indicating a number of times or information indicating a frequency with respect to the retrieval phrase received from the information processing terminal 1 within a preset period and store the information as statistical data. Further, the statistical data thus stored is associated with a retrieval phrase received from the information processing terminal 1.

Further, when the feature word generator 24 generates a plurality of feature words, the retrieval unit 25 may perform retrieval using a feature word having a higher priority among the plurality of feature words. Further, the retrieval unit 25 may preferentially output a retrieval result based on the feature word having a higher priority to a retrieval result based on a feature word having a lower priority. For example, the retrieval unit may sequentially output retrieval results based on feature words having a higher priority. The statistical data can also be used for weighting (to be described later).

(5: Construction of Accumulation Database)

The information accumulation apparatus 3 is capable of acquiring various types of information related to spots to be retrieved and constructing the accumulation database. For example, the information accumulation apparatus 3 may generate a feature word from an article posted on an SNS. For example, the information accumulation apparatus 3 may generate a feature word from an article posted on a website where spots are featured or on a site where review information on spots is published. Hereinafter, an article posted on an SNS or an article posted on a site where review information on spots is published is also referred to as a comment. Further, a website may be abbreviated as a site.

For example, in a case where the information accumulation apparatus 3 acquires a comment "excellent view" on a spot "observation platform X" posted on a reviews site, the information accumulation apparatus 3 performs the morphological analysis on the comment thus acquired to obtain words of "view" and "excellent". Next, the information accumulation apparatus 3 calculates feature vectors of the words that are results of the morphological analysis, and generates a feature word that is similar in feature vector to each of the words using the feature vectors thus calculated. Then, the information accumulation apparatus 3 adds the spot "observation platform X" to the accumulation database and records the words that are results of the morphological analysis and the feature words generated from the words in the accumulation database with the words and the feature words associated with the spot. When the spot "observation platform X" has already been recorded in the accumulation database, the information accumulation apparatus 3 additionally records the words that are results of the morphological analysis and the feature words generated from the words in the accumulation database with the words and the feature words associated with the already-recorded spot.

The information accumulation apparatus 3 may record a co-occurrence word or a cluster (to be described later) instead of or in addition to a feature word with the co-occurrence word or the cluster associated with a spot. Further, on such a site, an evaluation of each spot may be represented by a score, the number of stars, or the like. When the evaluation of each spot is represented by a score, the number of stars, or the like, the information accumulation apparatus 3 may also record the evaluation of the spot in the accumulation database. Besides such an evaluation, for example, the information accumulation apparatus 3 may record the number of accesses to the site, the number of accesses to a page of the spot, the number of comments given to the spot, the date and time at which a comment is posted, and a site name in the accumulation database. The site name may be, for example, a service name. These pieces of information can be used, for example, for weighting a spot, which allows the information retrieval system 10 to preferentially retrieve a spot having a higher evaluation, for example.

As described above, the information accumulation apparatus 3 can expand the accumulation database based on review information and allows a new spot to be retrieved. The information retrieval system 10 can perform retrieval based on an impression of a person who has actually visited a spot. For example, if a feature word based on the comment "excellent view" given to the spot "observation platform X" is recorded in advance, the information retrieval system 10 can detect the spot "observation platform X" based on an ambiguous retrieval phrase such as "filled with a sense of liberation".

Further, the construction of the accumulation database based on information related to spots allows the information retrieval system 10 to detect a spot that meets the user's intention even when an ambiguous retrieval phrase is input. In contrast, in typical search sites, various objects other than spots are also retrieval targets, so a spot that meets the user's intention cannot normally be detected based on an ambiguous retrieval phrase. For example, if retrieval is performed on a typical search site using a phrase "filled with a sense of liberation", the spot "observation platform X" is not detected or even if detected, the spot is buried in other miscellaneous retrieval results, which makes it difficult to recognize the spot.

[Retrieval Using Cluster]

As described in the above embodiment, the feature word generator 24 may set one word as a "feature word" or a word group including a plurality of words as a "feature word". The latter case will be described below in more detail with reference to FIG. 3.

In a case where the word group including a plurality of words is used as a feature word, in the accumulation database, a feature word group including a plurality of feature words having similar feature information indicating features of the words and a spot that is a retrieval target are associated with each other. The feature information is, for example, a feature vector. In the following description, the feature word group is also referred to as a cluster. Upon the retrieval phrase being input, the feature word generator 24 determines, based on feature information on a word included in the retrieval phrase thus input, a cluster corresponding to the word. Then, the retrieval unit 25 detects a spot associated with the cluster determined by the feature word generator 24 from the accumulation database.

This configuration allows the information retrieval system 10 to detect an appropriate spot that meets the intention of the user performing the retrieval even when a retrieval phrase that is not directly associated with the spot is input. For example, assume that, in a case where a cluster A including feature words such as "landscape" and "scenery" that are similar to each other and a spot A are associated with each other in the accumulation database, a retrieval phrase including a word "view" is input. In this case, in the information retrieval system 10, since "view" is similar to "landscape" or "scenery", it is determined that "view" belongs to the cluster A, thereby allowing the spot A to be detected from the accumulation database. Note that whether the feature information is similar can be determined, for example, based on whether a degree of similarity is equal to or greater than the predetermined threshold value.

Further, in the information retrieval system 10, in a case where the word group including a plurality of words is used as a feature word, the category database may be used in which a cluster including a plurality of feature words having similar feature information indicating features of the words and a category are associated with each other. In this case, the category identification unit 23 detects a category associated with a cluster determined based on the feature information on a word included in the retrieval phrase from the category database. This configuration allows the information retrieval system 10 to identify an appropriate category that meets the intention of the user performing the retrieval even when a retrieval phrase that is not directly associated with the category is input.

Figure 3:
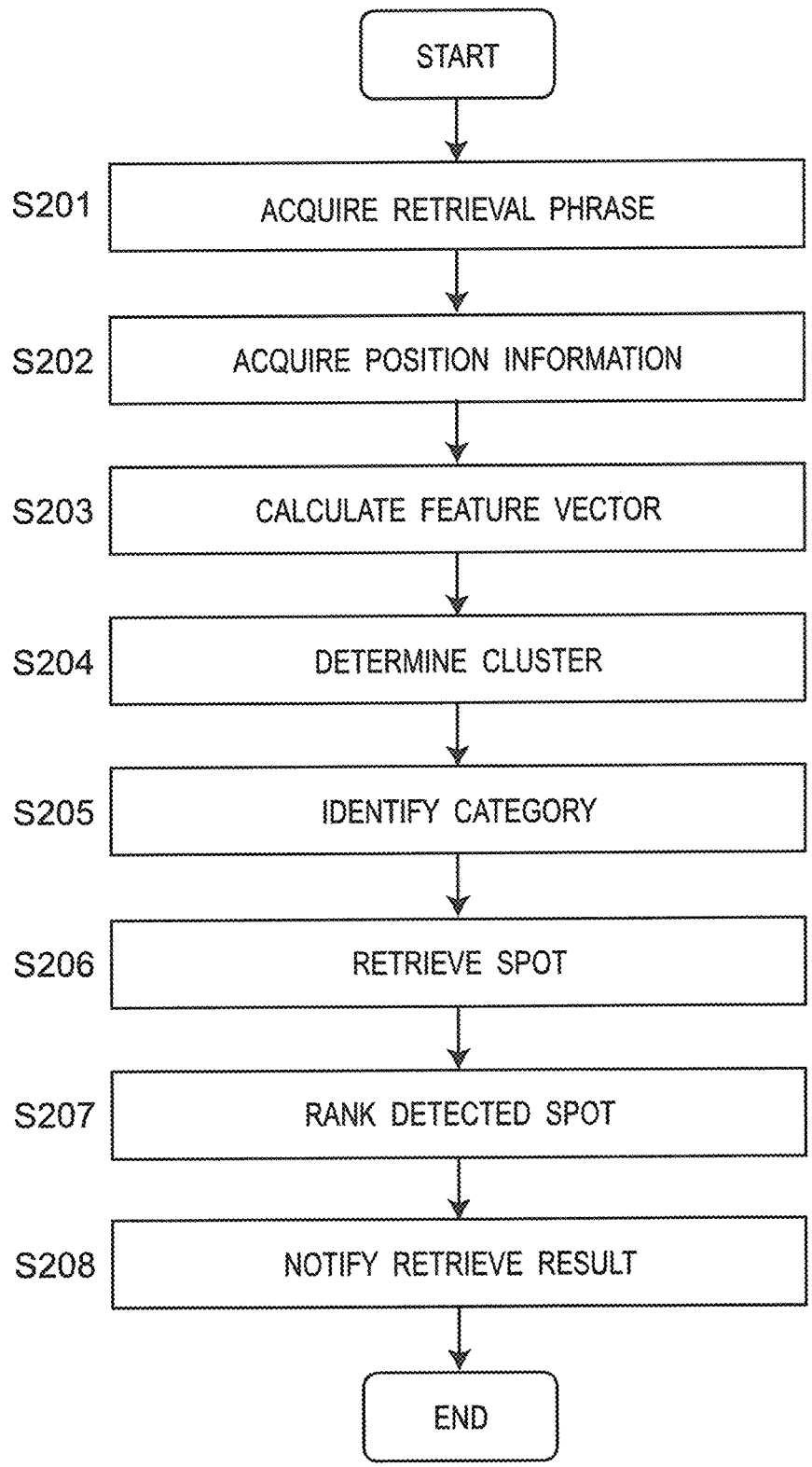
FIG. 3 is a flowchart showing an example of a process of retrieving a spot based on a cluster.

Hereinafter, a specific example of spot retrieval according to the flow of FIG. 3 will be described with reference to FIGS. 4 to 6. The category database and a spot database correspond to the accumulation database. Further, acquisition of the retrieval phrase and position information (S201, S202) in FIG. 3 is the same as the acquisition in FIG. 2; thus, the description of the acquisition will be omitted.

In S203, the feature word generator 24 calculates a feature vector of each word that results from performing the morphological analysis on the retrieval phrase. FIG. 4 shows an example in which four retrieval phrases of "view is beautiful" as Example 1, "view, beautiful" as Example 2, "landscape, lovely" as Example 3, and "fun dating" as Example 4 are input. For example, when the retrieval phrase of Example 1 is input, among words that result from performing the morphological analysis on "view is beautiful", feature vectors of "view" and "beautiful" excluding a verb "is" are calculated in S203. In the illustrated example, n-dimensional feature vectors are calculated. n may denote any natural number such as 300.

Next, the feature word generator 24 determines a cluster to which each word that results from performing the morphological analysis on the retrieval phrase belongs (S204). Specifically, the feature word generator 24 inputs the feature vector calculated in S203 to a predetermined clustering model to obtain a cluster corresponding to the feature vector, that is, an output of a cluster to which each word that results from performing the morphological analysis on the retrieval phrase belongs. For example, in the example of FIG. 4, both "view" and "landscape" are determined to belong to a cluster having a cluster ID "15". Both "beautiful" and "lovely" are determined to belong to a cluster having a cluster ID "8". Note that the clustering model is a model trained by machine learning, the model being configured to use a feature vector of a word as input data to output a cluster corresponding to the word. The cluster corresponding to the word is a cluster that includes feature words whose feature vectors are similar to the feature vector of the word in the component. A method of generating such a clustering model will be described later.

Next, the category identification unit 23 identifies a category of each word that results from performing the morphological analysis on the retrieval phrase based on the cluster determined in S204 (S205). For the category identification, a category database can be used in which a cluster ID, a feature word, a weight, and a category are associated with each other as shown in FIG. 5. Specifically, first, the category identification unit 23 extracts a category associated with the cluster identified in S204 from the category database. For example, Example 1 "view is beautiful" in FIG. 4 is determined to belong to clusters having the cluster ID "15" and the cluster ID "8" in S204, which causes a category "famous and historic site" and a category "restaurant" to be extracted from the category database shown in FIG. 5.

Next, the category identification unit 23 calculates a degree of similarity between each word that results from performing the morphological analysis on the retrieval phrase and each feature word that belongs to the category corresponding to the word and multiplies the degree of similarity thus calculated by a weight. For the calculation of a degree of similarity, an inter-word similarity estimation model based on fastText may be used. Then, calculated values are summed for each category, and the categories extracted are ranked in descending order of the total value. Hereinafter, the total value for each category is also referred to as a score.

Figure 4:
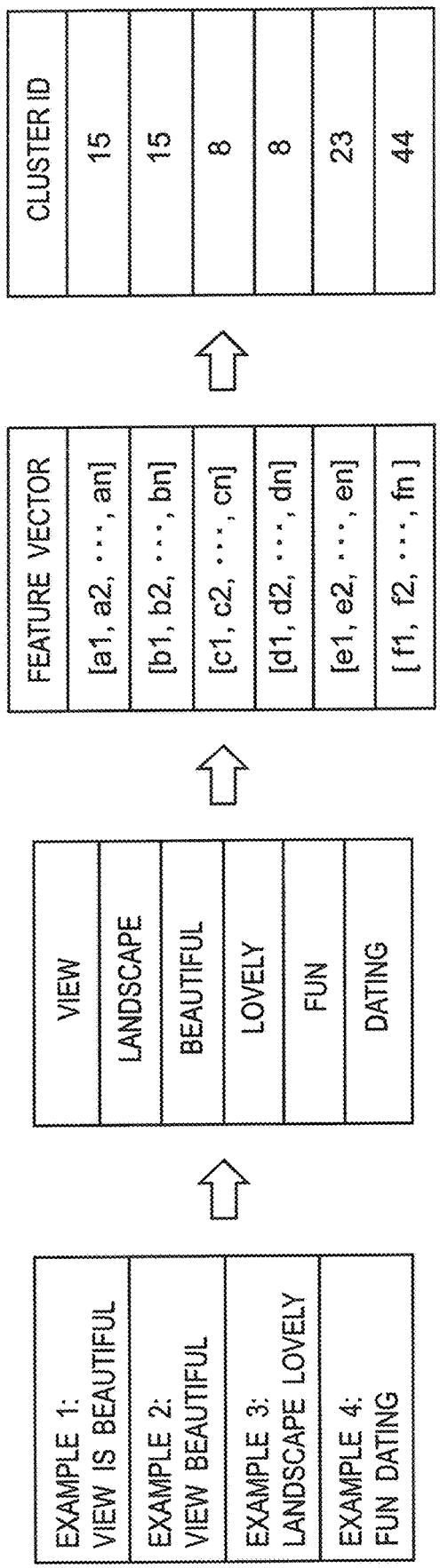
FIG. 4 is a diagram showing a specific example in which a cluster is determined from a retrieval phrase.

For example, with Example 1 "view is beautiful" in FIG. 4, a degree of similarity between the word "view" that results from performing the morphological analysis on the retrieval phrase and the feature word "landscape" registered in the category database is calculated for the category "famous and historic site". The same applies to the word "beautiful". Then, the degree of similarity thus calculated is multiplied by a weight registered in the category database. For example, if the degree of similarity between the word "view" and the feature word "landscape" is 0.8 and the degree of similarity between the word "beautiful" and the feature word "lovely" is 0.7, the score of the category "famous and historic site" is calculated as follows.

The word "view": degree of similarity "0.8"*weight "0.88"=0.704,

The word "beautiful": degree of similarity "0.7"*weight "0.76"=0.532, and

The score of the category "famous and historic site": 0.704+0.532=1.236.

In other words, the score is calculated by multiplying a numerical value of the degree of similarity by a numerical value of the weight for each word and adding up each multiplied value.

Note that, in a case where a plurality of feature words having the cluster ID "15" are registered in the category database, the calculation of the degree of similarity and the multiplication by the weight are performed on each feature word in the same manner as described above. The same applies to the cluster ID "8". Then, the category identification unit 23 sums values that are results of the multiplication for each category, calculates scores, and ranks the categories extracted in descending order of the score.

Next, the retrieval unit 25 retrieves a spot based on the cluster determined in S204 (S206). For the spot retrieval, the spot database can be used in which a cluster ID, a feature word, a weight, and a spot ID are associated with each other as shown in FIG. 6. Specifically, the retrieval unit 25 first extracts a spot associated with the cluster determined in S204 from the spot database. For example, Example 1 "view is beautiful" in FIG. 4 is determined to belong to the clusters having the cluster ID "15" and the cluster ID "8" in S204, which causes the spot "famous and historic site" and the spot "restaurant" to be extracted from the spot database shown in FIG. 6.

Next, the retrieval unit 25 calculates the degree of similarity between each word that results from performing the morphological analysis on the retrieval phrase and each feature word of the spot corresponding to the word, and multiplies the degree of similarity thus calculated by the weight. For the calculation of a degree of similarity, an inter-word similarity estimation model based on fastText may be used. Then, calculated values are summed for each spot, and the spots extracted are ranked in descending order of the total value. Hereinafter, the total value that results from summing the calculated values for each spot is also referred to as a score.

For example, in Example 1 "view is beautiful" in FIG. 4, a degree of similarity between the word "view" that results from performing the morphological analysis on the retrieval phrase and the feature word "scenery" registered in the spot database is calculated for a spot "famous site A" extracted. Note that the word "beautiful" matches the feature word "beautiful" registered in the spot database, which makes the degree of similarity to be 1. Then, the degree of similarity thus calculated is multiplied by the weight registered in the spot database. For example, if the degree of similarity between the word "view" and the feature word "scenery" is 0.9, the score of the spot "famous site A" is calculated as follows.

The word "view": degree of similarity "0.9"*weight "0.53"=0.477,

The word "beautiful": degree of similarity "1.0"*weight "0.46"=0.46, and

The score of the spot "famous site A": 0.477+0.46=0.937.

In other words, the score is calculated by multiplying a numerical value of the degree of similarity by a numerical value of the weight for each word and adding up each multiplied value.

Note that, in a case where a plurality of feature words having the cluster ID "15" are registered in the spot database, the calculation of the degree of similarity and the multiplication by the weight are performed on each feature word in the same manner as described above. The same applies to the cluster ID "8". Then, the values that are results of the multiplication are summed for each spot, and the spots extracted are ranked in descending order of the score corresponding to the total value.

Next, taking into account the category identification result in S205, the retrieval unit 25 finally ranks the spots detected in S206 (S207). For example, in the category identification in S205, the retrieval unit 25 may rank the spots belonging to the category having the highest score in descending order of the score calculated in S206. Note that it is predetermined to which category each spot belongs.

Then, after ranking all the spots belonging to the category having the highest score, the retrieval unit ranks the spots belonging to the category having the next highest score and may repeat the process until all the spots detected are ranked. Note that the retrieval unit 25 may terminate the repetition of the process when the ranking has been made to a predetermined rank. The predetermined rank is, for example, 20th rank from the top.

Note that the ranking method based on the scores of the category and the spot is not limited to the above example. For example, the retrieval unit 25 may calculate, for each spot detected in S206, the total value of the score of the spot and the scores of the categories to which the spot belongs and rank the spots in order of the total value. In this case, it can be said that the score of the category is used for weighting the score of the spot. Further, taking into account the above-described statistical data, the ranking in S207 may be performed. This allows a spot having a higher evaluation to be ranked higher, for example.

Finally, the retrieval communication device 21 notifies the information processing terminal 1 of the retrieval result (S209). As a result, the terminal control device 14 of the information processing terminal 1 causes the display device 13 to display the retrieval result. In a case where the retrieval result is displayed on the display device 13, the retrieval communication device 21 may notify the information processing terminal 1 of only a predetermined number of retrieval results ranked higher in S208 among the retrieval results. The predetermined number of retrieval results ranked higher are, for example, the top ten of the retrieval results.

Further, the retrieval communication device 21 may also notify the information processing terminal 1 of the ranking determined in S208. In this case, the terminal control device 14 can cause the display device 13 to display the retrieval results in accordance with the ranking. For example, in a case where the retrieval results are displayed on a map, a spot ranked higher may be displayed with a larger marker on the map. Accordingly, the information retrieval system 10 can cause the user to recognize which of the detected spots is more appropriate.

As described above, the information retrieval system 10 determines a cluster corresponding to a retrieval phrase and retrieves a spot using the cluster thus determined, thereby allowing the information retrieval system 10 to detect an appropriate spot from various retrieval phrases. For example, regardless of which of Example 1 "view is beautiful" in FIG. 4, Example 2 "view, beautiful" in FIG. 4, and Example 3 "landscape, lovely" in FIG. 4 is used as the retrieval phrase, the same spot can be detected. Further, when the retrieval phrase is Example 4 "Fun Dating" in FIG. 4 that is completely different from Examples 1 to 3, clusters different from clusters of Examples 1 to 3 are determined, and, as a result, a different spot, for example, an amusement park F is detected.

Further, a cluster can also be used to identify a category, and the identification of a category allows spots belonging to the category to be detected. Furthermore, with respect to a combination of a spot and a feature word, or a combination of a category and a feature word, the higher relevance of the combination is, the larger a weight to be applied is, which allows a more appropriate spot to be preferentially detected.

(Modification of Category Identification and Spot Retrieval)

In the category identification in S205, although the degree of similarity between the word that results from performing the morphological analysis on the retrieval phrase and the feature word registered in the category database is calculated, this process can be omitted. In this case, in S205, the category identification unit 23 may calculate the sum of the weight values of cluster IDs associated with a category, and use the value thus calculated as the score of the category.

Likewise, in the spot retrieval in S206, the calculation of the degree of similarity can be omitted. In this case, in S206, the retrieval unit 25 may calculate the sum of the weight values of cluster IDs associated with a spot, and use the value thus calculated as the score of the category.

[Generation of Category Database and Spot Database]

(1: Configuration for Realization)

The information retrieval system 10 may have a function of generating the category database and the spot database. For example, components for implementing this function may be provided to the information retrieval apparatus 2 or the information accumulation apparatus 3. Further, a device having this function may be separately added to the information retrieval system 10.

Figure 7:
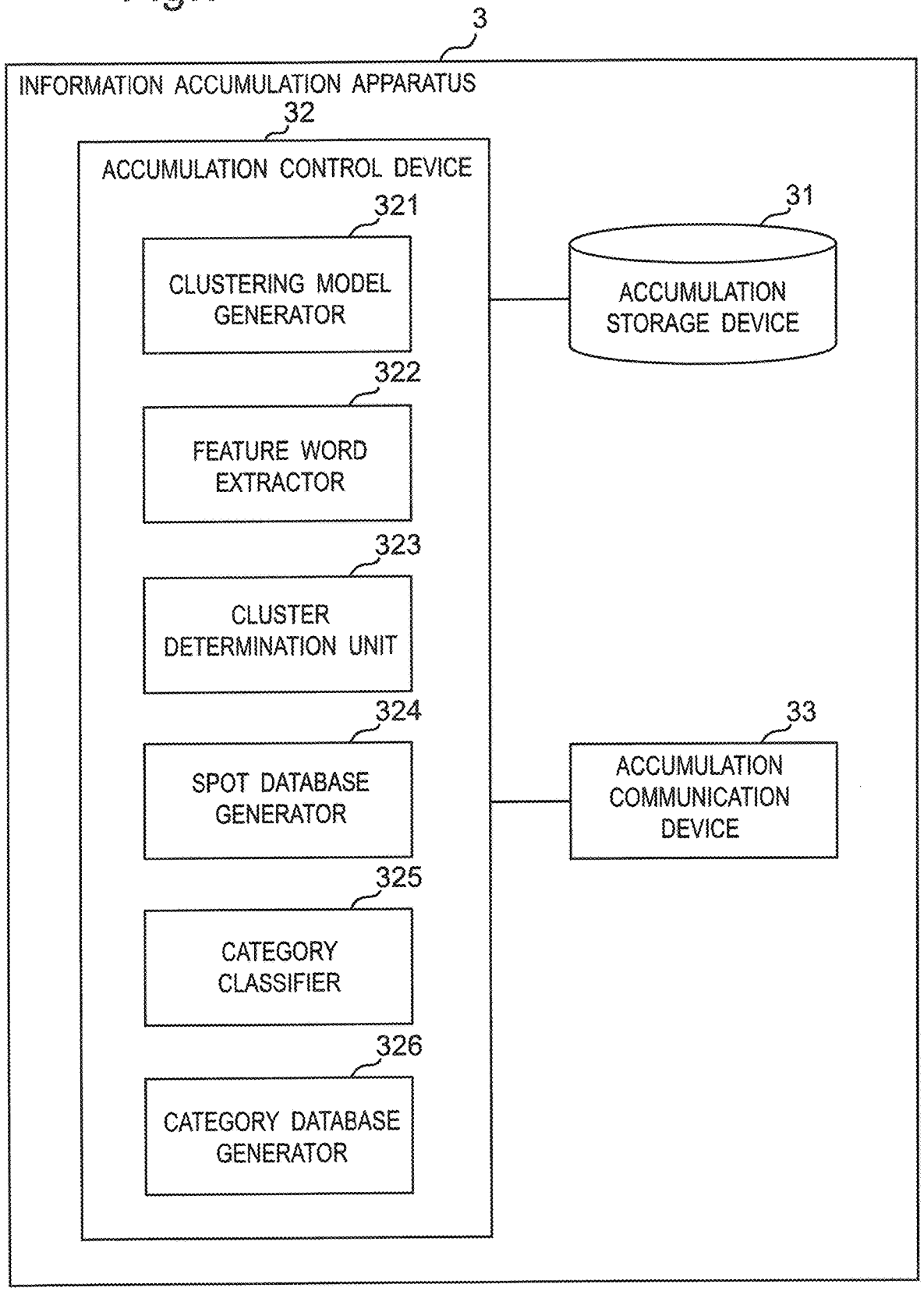
FIG. 7 is a block diagram showing an example of a configuration of a main part of an information accumulation apparatus.

A description will be given below with reference to FIG. 7 as an example in which the information accumulation apparatus 3 has the function of generating the category database and the spot database. FIG. 7 is a block diagram showing an example of a configuration of a main part of the information accumulation apparatus 3. As shown in FIG. 7, the accumulation control device 32 includes a clustering model generator 321, a feature word extractor 322, a cluster determination unit 323, a spot database generator 324, a category classifier 325, and a category database generator 326. In the following description, such a database may be abbreviated as DB. A function of each of the units can also be implemented by a program, for example. For the generation of the category database and the spot database, review information posted on a predetermined site is used. Assume that at least one sentence is included in each review. Herein, the predetermined site may be a plurality of sites or an SNS. Further, in the following description, the review information may be abbreviated simply as a review.

The clustering model generator 321 generates a clustering model for clustering words. The clustering may be performed based on, for example, the degree of similarity among feature vectors, which allows similar words roughly grouped together to be handled as one cluster. Note that it can be said that "similar words roughly grouped together" is a rough synonym group. For the calculation of the feature vector of a word, a vectorization model based on fastText may be used, for example. The clustering model thus generated is used for determination of a cluster in S204 of FIG. 3. The clustering allows retrieval on a cluster-by-cluster basis, which further allows the retrieval to be performed more efficiently and at a higher speed.

The feature word extractor 322 extracts a feature word in an input sentence. For the extraction of a feature word, co-occurrence word analysis can be used, for example. Specifically, the feature word extractor 322 calculates a TF-IDF value for each word included in a word group that results from performing the morphological analysis on the input sentence. Then, the feature word extractor 322 ranks, based on the TF-IDF values thus calculated, the words included in the word group, and extracts the words ranked higher as the feature words. Further, the TF-IDF value is a numerical value indicating accuracy of a feature word, and therefore the feature word extractor 322 sets the TF-IDF values of the feature words extracted as weight values of the feature words.

Using the clustering model generated by the clustering model generator 321, the cluster determination unit 323 determines a cluster of the feature words extracted by the feature word extractor 322. The cluster thus determined has a plurality of feature words having similar feature information as a component.

The spot DB generator 324 associates a spot, a feature word, a cluster thereof, and a weight value with each other to generate a spot database as shown in FIG. 6. The feature word and the weight value are extracted and calculated by the feature word extractor 322. The cluster is determined by the cluster determination unit 323.

The category classifier 325 classifies the input sentence into a plurality of predetermined categories. For the classification, a classification model constructed based on supervised machine learning may be used. As the classification model, for example, a text classification model based on fastText may be used. In machine learning, a sentence whose category is known is used as training data. For example, in the training data, a category may be associated, for example, manually, with each review posted on the predetermined site.

The category DB generator 326 associates a category, a feature word, a cluster, and a weight value with each other to generate a category database as shown in FIG. 5. The feature word and the weight value are extracted and calculated by the feature word extractor 322. The cluster is determined by the cluster determination unit 323.

(2: Process Flow)

Figure 8:
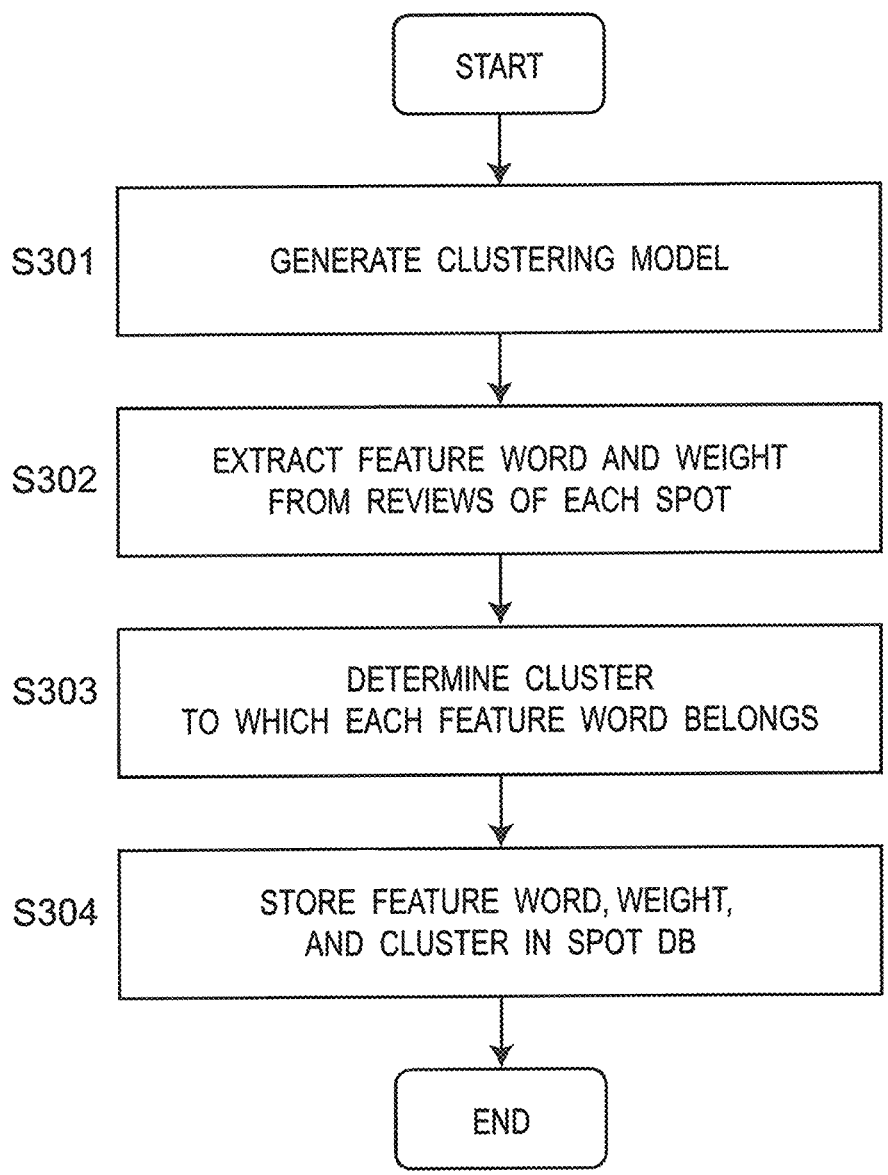
FIG. 8 is a flowchart showing an example of a process of generating the spot database.

An example of a process flow of generating the spot database will be described below with reference to FIG. 8. Upon starting the process of generating the spot database, the clustering model generator 321 generates a clustering model (S301). For example, the clustering model generator 321 calculates feature vectors of all words that result from performing the morphological analysis on all reviews posted on the predetermined site. The clustering model generator 321 can generate the clustering model based on the feature vectors thus calculated. In this case, the clustering model thus generated is a model used for classifying input words into clusters whose feature vectors are similar to feature vectors of the input words. For example, fastText can also be used for the generation of a model.

Next, the feature word extractor 322 extracts feature words and weights from reviews of each spot (S302). The extraction of feature words and weights can be performed, for example, using TF-IDF values. Note that a correspondence between each review and a spot is specified in advance based on which spot the review is posted, for example. For example, if a review is posted on a page of a predetermined site featuring a famous site A, the famous site A and the review are recorded with the famous site A and the review associated with each other, which allows the feature word extractor 322 to determine that the review is directed to the famous site A.

Next, the cluster determination unit 323 determines clusters to which the feature words extracted in S302 belong using the clustering model generated in S301 (S303). Both the process of S302 and the process of S303 cause the feature words, the weights, and the clusters to be determined for each of the reviews posted for each spot.

Next, the spot DB generator 324 stores the feature words, the weights, and the clusters thus determined in the spot database with the feature words, the weights, and the clusters being associated with the spot (S304). This causes a record in which feature words, clusters, and weights are associated with each spot to be added to the spot database. Note that if the spot database has not been generated, the spot database is generated in S304.

Figure 9:
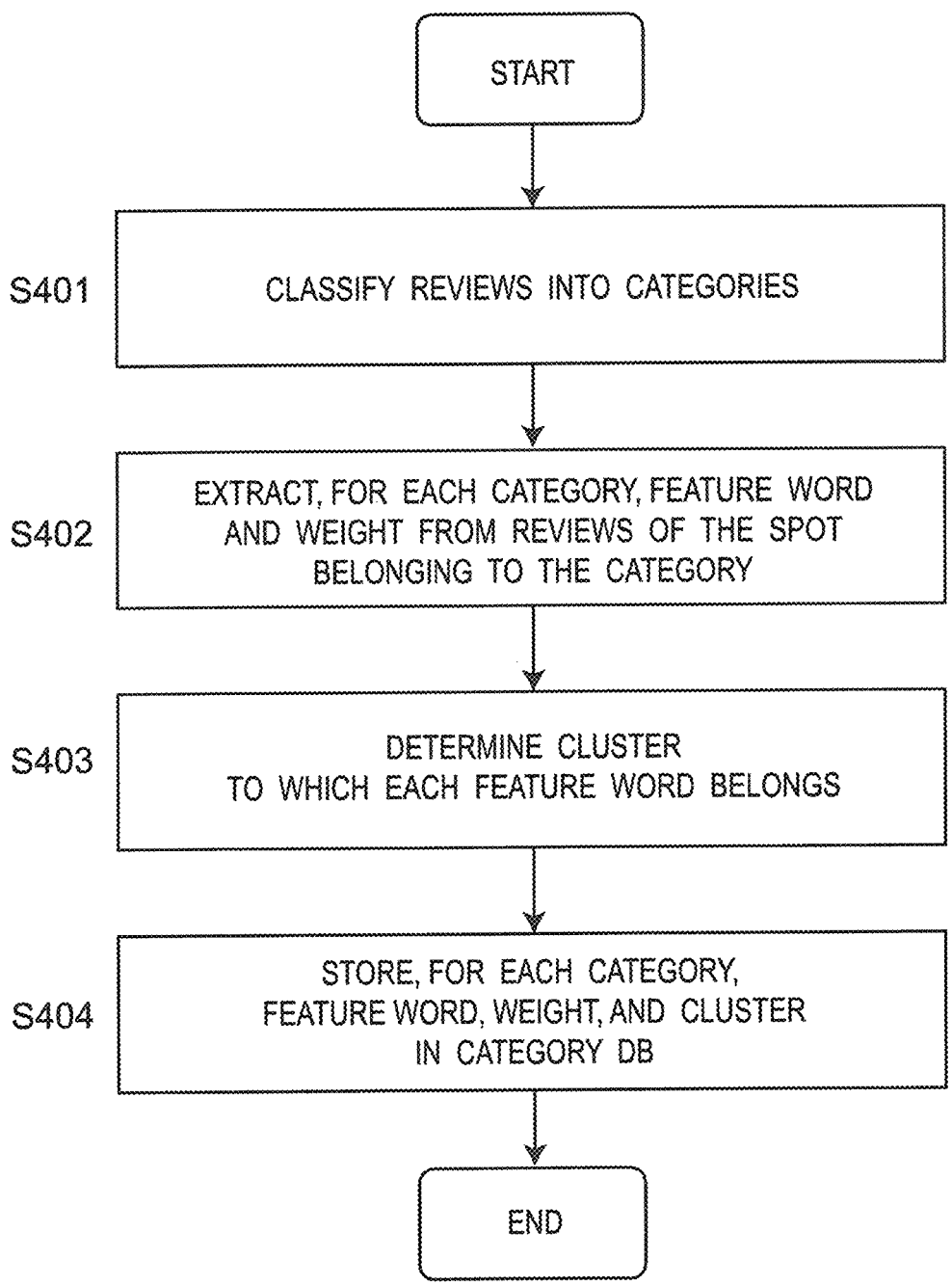
FIG. 9 is a flowchart showing an example of a process of generating the category database.

Next, an example of a process of generating the category database will be described with reference to a flowchart shown in FIG. 9. Upon starting the process of generating the category database, the category classifier 325 classifies the reviews posted on the predetermined site into categories (S401).

Next, the feature word extractor 322 extracts feature words and weights from reviews belonging to each of the categories (S402). The extraction of feature words and weights can be performed, for example, using TF-IDF values. Note that, in S402, the feature words and weights extracted in S302 may be used.

Next, the cluster determination unit 323 determines clusters to which the feature words extracted in S402 belong using the clustering model generated in S301 (S403). For the reviews belonging to each category, the feature words, the weights, and the clusters are determined in the process of S302 and the process of S403.

Finally, the category DB generator 326 stores the feature words, weights, and clusters thus determined in the category database with the feature words, weights, and clusters associated with a corresponding category (S404).

This causes a record in which feature words, clusters, and weights are associated with each category to be added to the category database. Note that if the category database has not been generated, the category database is generated in S404.

(3: Summary)

As described above, the clustering model generator 321 calculates a feature vector of each word that results from performing the morphological analysis on reviews, and generates a clustering model based on the feature vectors thus calculated. Based on the clustering model thus generated, retrieval phrases including expressions similar to reviews can be clustered with high accuracy. Further, the clustering model can be generated only from reviews.

The spot database and the category database can be generated based on the clustering model thus constructed and the reviews. The spot database and the category database can also be generated only from the reviews. Further, acquiring the latest reviews at any time makes it possible to expand the databases. Such reviews include the latest terms used in evaluating or expressing spots or categories; thus, the use of each of the databases generated allows retrieval using the latest terms to be performed.

Further, the cluster determination unit 323 determines clusters to which feature words belong based on the clustering model, and the spot DB generator 324 stores the clusters determined by the cluster determination unit 323 and spots with the clusters and the spots associated with each other. This allows the retrieval unit 25 to detect, even when a retrieval phrase including words that are not directly associated with a spot is input, an appropriate spot by using a cluster corresponding to the words.

Similarly, the category DB generator 326 stores the clusters determined by the cluster determination unit 323 and the categories that are results of the classification of the category classifier 325 with the clusters and the categories associated with each other. This allows the category identification unit 23 to identify, even when a retrieval phrase including words that are not directly associated with a category is input, an appropriate category by using a cluster corresponding to the words.

Furthermore, the feature word extractor 322 extracts feature words and calculates weights of the feature words, and the spot DB generator 324 stores the spots, the clusters, the feature words, and the weights with the spots, the clusters, the feature words, and the weights associated with each other. This allows a degree of relevance to a spot of each of the feature words belonging to one cluster to be identified based on a corresponding weight value. Therefore, the retrieval unit 25 can rank retrieval results based on the degree of relevance between the feature word corresponding to the retrieval phrase and the spot.

Similarly, the category DB generator 326 stores categories, clusters, feature words, and weights with the categories, the clusters, the feature words, and the weights associated with each other. This allows a degree of relevance to one category of each of the feature words belonging to the category to be identified based on a corresponding weight value. Therefore, the category identification unit 23 can rank category identification results based on the degree of relevance between the feature word corresponding to the retrieval phrase and the category.

(About Re-Training)

In a case where a model generated based on supervised machine learning is used for retrieval, training data is generated based on results of retrieval, and the model thus generated may be updated through re-training by machine learning using the training data. For example, assume that a certain retrieval phrase is input, the category identification (S204) and the spot retrieval (S206) are performed, and any of the spots notified to the information processing terminal 1 is selected by the user. In this case, it is considered that the selected spot meets the user's intention. Therefore, data that results from associating the retrieval phrase or words constituting the retrieval phrase and feature vectors thereof, and the spot or the category thereof with each other may be used as training data. For example, data that results from associating the retrieval phrase with the category of the spot thus selected may be used as training data for updating the classification model used by the category classifier. Updating the classification model through re-training using the training data allows classification accuracy in S401 to be improved.

[Modification of Generation of Category Database and Spot Database]

(1: Configuration for Realization)

Figure 10:
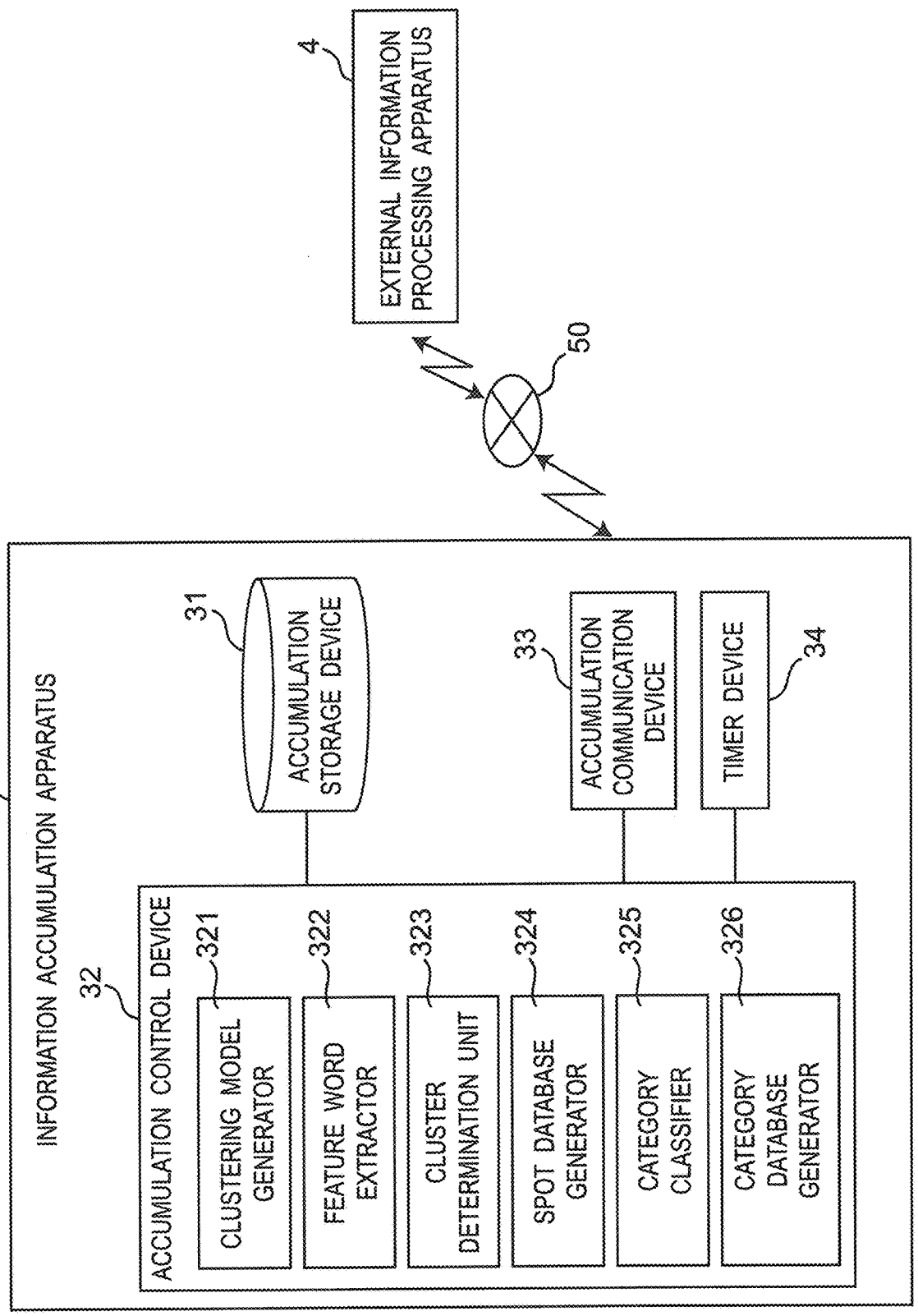
FIG. 10 is a block diagram showing a modification of the configuration of the main part of the information accumulation apparatus.

A description will be given below with reference to FIG. 10 as a modification in which the information accumulation apparatus 3 is provided with a function of generating the category database and spot database different from databases shown in FIG. 7. The information accumulation apparatus 3 includes a timer device 34 in addition to the accumulation storage device 31, the accumulation control device 32, and the accumulation communication device 33. A function of each of the devices can also be implemented by a program, for example. In other words, the information accumulation apparatus 3 shown in FIG. 7 and the information accumulation apparatus 3 shown in FIG. 10 have the same configuration except that the timer device 34 is connected to the accumulation control device 32. Hereinafter, any description overlapping the description of FIG. 7 will be omitted. For the generation of the category database and spot database, review information is used as post article information posted on a predetermined site of the external information processing apparatus 4. The information accumulation apparatus 3 and the external information processing apparatus 4 are connected by wireless, for example, via the public communication network 50. In FIG. 10, flows of information to be communicated via the public communication network 50 are indicated by bidirectional arrows.

In the information accumulation apparatus 3 shown in FIG. 10, the accumulation control device 32 is electrically connected to the timer device 34. The accumulation control device 32 is capable of acquiring time information from the timer device 34. The spot DB generator 324 associates the time information with a spot, a feature word, a cluster, and a weight value to generate the spot database. The category DB generator 326 associates the time information with a category, a feature word, a cluster and a weight value to generate the category database. The time information is, for example, information on a time clocked by the timer device 34. Like the timer 26 of the information retrieval apparatus 2, the timer program is executed on the computer, thereby enabling the timer device 34 to clock a time in a year, month, day, and hour format.

(2: Process Flow)

Figure 11:
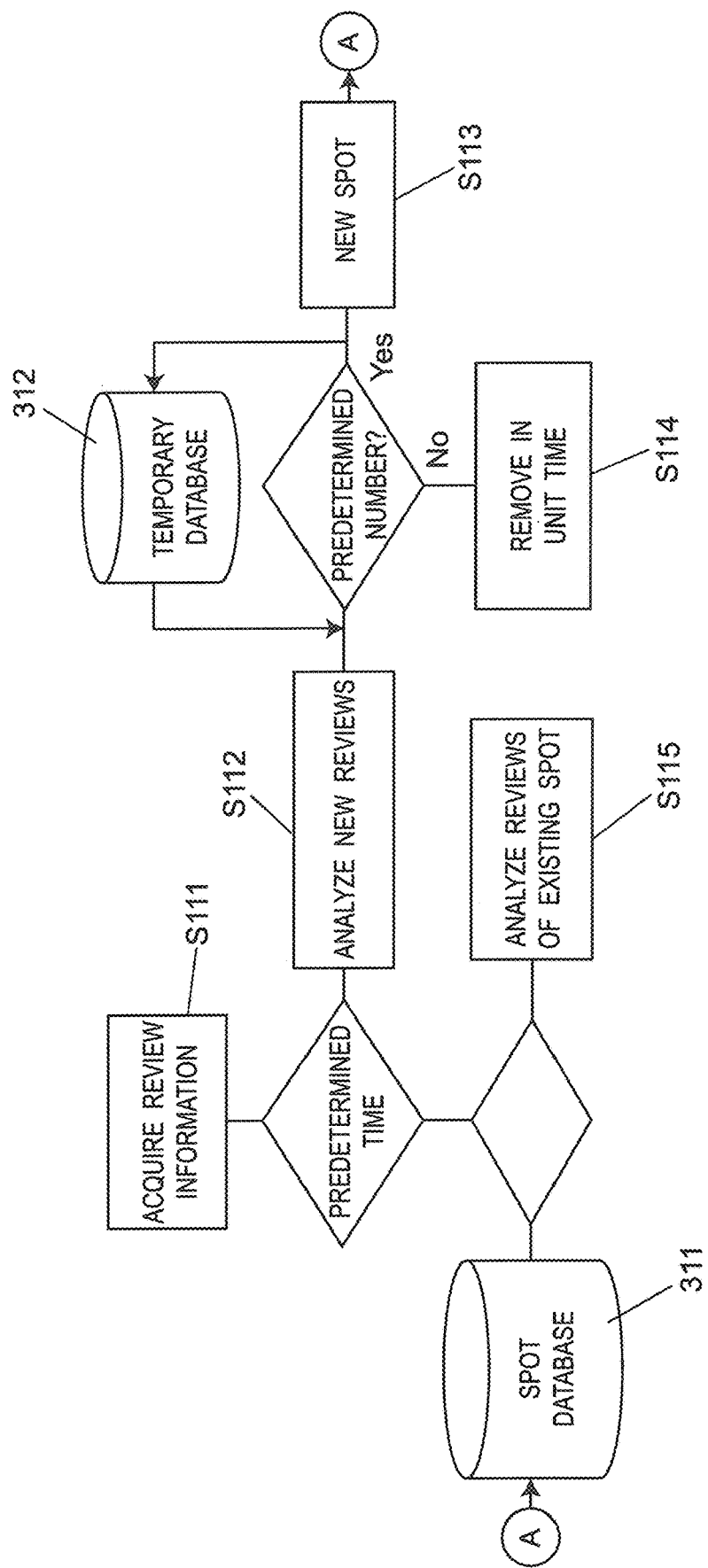
FIG. 11 is a flowchart showing another example of a process of generating an accumulation database.

FIG. 11 shows an example of a process of updating the spot database and the category database when the information accumulation apparatus 3 acquires the review information from the external information processing apparatus 4. The information accumulation apparatus 3 acquires reviews from the external information processing apparatus 4 via the accumulation communication device 33 at predetermined intervals (S111). More specifically, the information accumulation apparatus 3 collects review information via a web API of an SNS.

Further, the information accumulation apparatus 3 analyzes new reviews in the review information thus acquired. In order to analyze new reviews, the information accumulation apparatus 3 determines whether reviews are new reviews that have been posted within a predetermined period. The predetermined period may be, for example, a period between the current time clocked by the timer device 34 and a time a predetermined time before from the current time. Next, the information accumulation apparatus 3 analyzes the new reviews on the machine learning basis (S112). The analysis of the new reviews can be performed in the same manner as the processes of FIG. 8 and FIG. 9.

The information accumulation apparatus 3 counts the number of times of detection of a new spot within the predetermined period based on results of the analysis of the new reviews. The information accumulation apparatus 3 can determine whether a spot that results from analyzing the review information is a new spot by comparing the spot with the spot database 311 in which spots have been registered in advance. In order to count the number of times of detection of the new spot, the information accumulation apparatus 3 saves the number of times of detection of the new spot in a temporary database 312 shown in FIG. 11. In the information accumulation apparatus 3, for example, the temporary database 312 may be stored in the accumulation storage device 31. When the number of times of detection of the new spot is greater than a predetermined threshold number of times or a threshold number of times, the information accumulation apparatus 3 causes the spot database generator 324 to add the new spot to the spot database 311 (S113). The spot database 311 may be stored, for example, in the accumulation storage device 31.

When the number of times of detection of the new spot is less than the predetermined threshold number of times in a predetermined unit time, the information accumulation apparatus 3 causes the spot database generator 324 to remove the new spot from the temporary database 312 (S114). The predetermined unit time may be the same as or different from the predetermined period.

Next, the information accumulation apparatus 3 analyzes review information on an existing spot. The information accumulation apparatus 3 determines whether a spot that results from analyzing the review information is an existing spot by comparing the spot with the spot database 311 in which spots have been registered in advance. The information accumulation apparatus 3 analyzes reviews of the existing spot on the machine learning basis (S115). The analysis of the reviews of the existing spot can be performed in the same manner as the processes of FIG. 8 and FIG. 9.

Note that, in the information accumulation apparatus 3, the step of analyzing comments in new reviews, and the step of analyzing reviews of existing spots need not follow the order of the new analysis step of S112 and the existing analysis step of S115, and the new analysis step may be performed after the existing analysis step. In the information accumulation apparatus 3, the new analysis step of analyzing new reviews and the existing analysis step of analyzing reviews of existing spots may be performed in parallel.

(3: Summary)

[Other Modification]

A modification of the information processing terminal 1 will be described below in detail. When a user inputs any characters in a search box for inputting a character string to be retrieved of the information processing terminal 1, the information retrieval apparatus 2 performs retrieval using a retrieval phrase related to the input characters, and candidates that are results of the retrieval performed by the information retrieval apparatus 2 are displayed below the search box.

The information processing terminal 1 is capable of attaching a bookmark to a place where the user wants to visit or a place where the user has visited. The information processing terminal 1 allows the user to enable a check box that indicates whether the user has visited a corresponding place, which makes it possible to represent that the user has visited the place. A place to which the user has attached a bookmark and where the user wants to visit, or a place where the user has visited is the basis of recommendations. The information processing terminal 1 allows the user to indicate as if the user has visited a predetermined place using the position information.

The information processing terminal 1 causes the display device 13 to display a standard word that the user will frequently use and a hot word that will be a recommendation. The information processing terminal 1 is capable of performing retrieval with the standard word and the hot word in addition to the retrieval phrase that the user has input in the search box of the information processing terminal 1.

Figure 12:
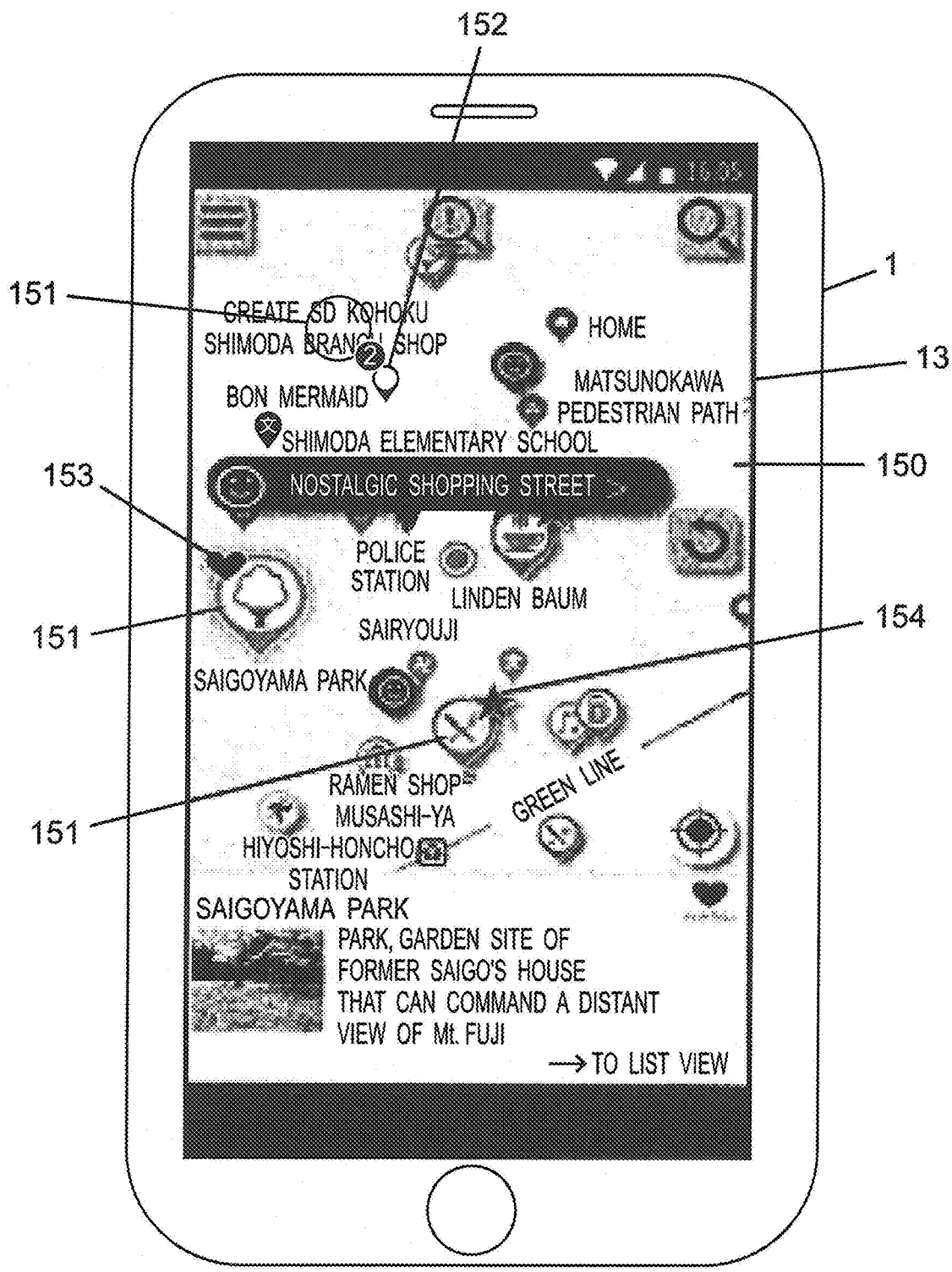
FIG. 12 is a schematic diagram showing a retrieval example displayed on a display device of an information processing terminal.

The information processing terminal 1 is configured to, when there is a new comment directed to an existing spot, reflect the new comment. The information processing terminal 1 can access the information accumulation apparatus 3 via the information retrieval apparatus 2, detect a spot within the predetermined period of the information accumulation apparatus 3, and cause the display device 13 to display the new spot. As shown in FIG. 12, the information processing terminal 1 causes the display device 13 to display a count value at a lower right of an icon 151 on the map 150, the count value being increased by predetermined reference value. For example, the count value is a numerical value that is increased by the predetermined reference value when at least a predetermined number of users have left favorable comments as reviews. The information processing terminal 1 may display the icon 151 such that the color of the icon 151 varies in a manner that depends on whether the icon 151 indicates an existing spot or a new spot. For example, the information processing terminal 1 may dispose, at an upper left of the icon 151, a heart 153 indicating a spot where the user wants to visit. For example, the information processing terminal 1 may dispose, at an upper right of the icon 151, a star 154 indicating a recommendation.

The information processing terminal 1 is not limited to the configuration where the map information is stored in advance in the terminal storage device 15. The information processing terminal 1 may have a configuration where the map information is stored in the terminal storage device 15 via communication from the information retrieval apparatus 2. As the map information, for example, topographical map information, regional map information, geological map information, land-use map information, residential map information, route map information, road map information, guide map information, aerial photograph information, satellite photograph information, or old map information can be used. The map information may be, for example, raster data or vector data.

The information processing terminal 1 may have a navigation function. In a case where the information processing terminal 1 has the navigation function, the information processing terminal 1 may be configured to display a recommendation on a map when the information processing terminal 1 approaches a check point on a route. The check point may be, for example, a POI desired to be recommended to the user, a spot where a treasure is buried in a treasure hunting game, or a charging station for an electric vehicle. When acquiring information from a plurality of SNSs, the information processing terminal 1 may register another ID linking login IDs of the plurality of SNSs.

Hereinafter, a modification of the information retrieval apparatus 2 will be described in detail. The information retrieval apparatus 2 retrieves a retrieval phrase by presuming that words frequently appearing in reviews collected within the predetermined period from an SNS or a Web are most related to each of the retrieval history, the hot word, and the standard word. The information retrieval apparatus 2 may be configured to retrieve any combination of the retrieval history, the hot word and the standard word. The hot word is a word statistically processed per unit time. The hot word is a word frequently appearing in reviews per unit time. The hot word may include, in addition to a word statistically processed per unit time, a word corresponding to a spot within a predetermined range from a retrieval point. Accordingly, the hot word can include an event such as a local festival. In other words, it can be said that the hot word is a word indicating a recommendation to the user. The standard word is a word presumed to be frequently used by the user.

Hereinafter, a spot getting a large degree of attention is also referred to as a hot spot. In a case of retrieving the hot spot, the information retrieval apparatus 2 may be configured to retrieve information within the predetermined period from the current time in the accumulation database stored in the accumulation storage device 31.

The information retrieval apparatus 2 may perform retrieval based on, for example, hot spot information and use history information in addition to the retrieval phrase via a user's operation on the information processing terminal 1. Examples of the hot spot information include a new spot newly registered in the spot database 311 by the accumulation storage device 31 of the information accumulation apparatus 3. Examples of the use history information include retrieval history information on retrieval performed by the user in the past, and registration information on registration performed by the user in the past. In other words, it can be said that the use history information is operation history information on operation performed by the user on the information processing terminal 1.

Since the information retrieval apparatus 2 performs retrieval on the information accumulation apparatus 3 using the use history information on the user, a retrieved retrieval target is optimized for each user. In other words, the information retrieval apparatus 2 is capable of presenting a recommended word to the user by using the use history as a parameter even if the user attribute information indicating the attribute of the user has not been stored enough in advance in the accumulation storage device 31 of the information accumulation apparatus 3. The information retrieval apparatus 2 may acquire the position information acquired from a sensor via which the information processing terminal 1 acquires the position information from a base station of the public communication in addition to a GPS that is the satellite positioning system. In a case where a new spot is registered in the accumulation storage device 31 of the information accumulation apparatus 3, the information retrieval apparatus 2 may be capable of transmitting a push notification to the terminal communication device 12 of the information processing terminal 1 such that the hot spot can be displayed on the display device 13 of the information processing terminal 1.

A modification of the information accumulation apparatus 3 will be described in detail below. The information accumulation apparatus 3 may acquire the review information from a plurality of external information processing apparatuses 4. In a case where the reviews are subject to analysis, it is preferable that the information accumulation apparatus 3 be capable of extracting only a Japanese word or removing a space or a symbol from the review information in advance. Such reviews are often written in incorrect Japanese. Further, the reviews may include symbols. When the reviews are not written in correct Japanese or the reviews include symbols, a desired morphological analysis on the review information may fail. In a case where the reviews are subject to analysis, the information accumulation apparatus 3 can perform more accurate retrieval by extracting only a Japanese word or removing a space or a symbol from the review information in advance.

For example, in a case where at least a predetermined number of users have left favorable comments as reviews, the information accumulation apparatus 3 is configured to register a spot as a new spot in the spot database 311 when the number of counts that is increased by the predetermined reference value is greater than the predetermined number of counts. The information accumulation apparatus 3 identifies the category of the new spot thus registered, the category being, for example, a cafe, a restaurant, or scenery. The information accumulation apparatus 3 registers the new spot together with the category thus identified in the category database. In other words, the information accumulation apparatus 3 stores the hot word or the standard word in the accumulation storage device 31.

As described above, even if the user does not know the name of "Tonkotsu ramen shop" where the user visited in the past, when the user inputs "Ramen" in the search box, the information retrieval system 10 can retrieve the name of "Tonkotsu ramen shop" by using the use history information associated with the user.

Further, even if the information processing terminal 1 is replaced with another information processing terminal 1 and thereby the use history of the user disappears from the information processing terminal 1, the information retrieval system 10 allows the other information processing terminal 1 after the replacement to perform the same retrieval using the use history information or the like registered in the information retrieval apparatus 2 or the information accumulation apparatus 3.

The information accumulation apparatus 3 of the information retrieval system 10 creates a retrieval type for each user that indicates what the user is interested in, based on a list of places where the user wants to visit or a list of places where the user has been visited and a retrieval history that is a history of access to pages where details of retrieval results are shown. The information retrieval apparatus 2 can distinguish the retrieval type of a user from similar types of other users on the machine learning basis. The information processing terminal 1 can give, to the user performing retrieval, recommendations for a spot where another user has visited. That is, for example, when the use frequency of the information retrieval system 10 by the user increases, the information retrieval system 10 is configured to give recommendations for a place to the user based on the list of places where the user wants to visit or the list of places where the user has visited, and the retrieval history that is a history of access to pages where details of retrieval results are shown.

For example, the information retrieval system 10 determines, on the machine learning basis, whether it is a valid comment that makes a recommendation for something from reviews added by an SNS such as "I went to xxx for lunch today, it was very good". If it is a valid comment that makes a recommendation, the information processing terminal 1 outputs a recommended place on the map displayed on the display device 13. In other words, the information accumulation apparatus 3 selects a positive comment that newly makes a recommendation to everyone from reviews posted on an SNS on the machine learning basis, and displays a spot related to the comment on the map.

Obviously, numerous modifications and variations of the present invention are possible in light of the above teachings. It is therefore to be understood that within the scope of the appended claims, the invention may be practiced otherwise than as specifically described herein.

What is claimed is:

1. An information retrieval apparatus comprising:
   a retrieval phrase acquisition device to acquire a retrieval phrase from an input device;
   a retrieval storage device storing a word corresponding to a category; and
   a controller configured to
      generate a feature word from the retrieval phrase, the feature word being related to a word representing a retrieval target, the feature word corresponding with a feature vector that contains a degree of similarity of cosine equal to or greater than a predetermined threshold value, with a feature vector of distributed representation of the word representing the retrieval target,
      acquire a position information indicating a position on a map that is a starting point of retrieval, the retrieval target having a point of interest (POI) information indicating a point of interest (POI),
      identify the category based on whether a word included in the retrieval phrase matches the word stored in the retrieval storage device, wherein the controller is configured to estimate, on a machine learning basis, the category from a word included in the retrieval phrase in a case where said category is not directly identified by the controller based on non-machine learning basis, using training data, and
      retrieve the retrieval target corresponding to the feature word based on the feature word, the position information and the category from an accumulation database that accumulates the feature word classified by the category and the retrieval target corresponding to the feature word, the retrieval target corresponding to the feature word such that the POI indicated by the POI information is located within a predetermined range from the position,
   wherein the controller is further configured to extract a co-occurrence word that co-occurs from two or more words included in the retrieval phrase and replace the co-occurrence word with a retrieval word having a degree of similarity equal to or greater than a predetermined threshold value, to a word clustered in advance by each category.

2. The information retrieval apparatus according to claim 1, wherein the controller is configured to acquire the position information estimated from a word included in the retrieval phrase on a machine learning basis.

3. The information retrieval apparatus according to claim 1, wherein the controller is configured to generate the feature word from a word including a noun, an adjective, a verb, or an adverb in the retrieval phrase.

4. The information retrieval apparatus according to claim 1, wherein
   a feature word group including a plurality of the feature words and the retrieval target are associated with each other in the accumulation database, the plurality of the feature words being similar to feature information indicating a feature of a word, and
   the controller is configured to
      determines the feature word group corresponding to the word based on the feature information on a word included in the retrieval phrase, and
      detect the retrieval target associated with the feature word group determined by the controller from the accumulation database.

5. An information retrieval system comprising:
   an information processing terminal to receive a retrieval phrase;
   an information accumulation apparatus to accumulate a feature word and a retrieval target corresponding to the feature word;
   a retrieval storage device storing a word corresponding to a category; and
   an information retrieval apparatus to communicate with the information processing terminal, and the information retrieval apparatus comprising:
   a retrieval phrase acquisition device to acquire the retrieval phrase from the information processing terminal; and
   a controller configured to
      generate the feature word from the retrieval phrase, the feature word being related to a word representing the retrieval target, the feature word corresponding with a feature vector that contains at least a degree of similarity of cosine equal to or greater than a predetermined threshold value, with a feature vector of distributed representation of the word representing the retrieval target, acquire a position information indicating a position on a map that is a starting point of retrieval, the retrieval target having a point of interest (POI) information indicating a point of interest (POI), identify the category based on whether a word included in the retrieval phrase matches the word stored in the retrieval storage device, wherein the controller is configured to estimate, on a machine learning basis, the category from a word included in the retrieval phrase in a case where said category is not directly identified by the controller based on non-machine learning basis, using training data, and retrieve the retrieval target corresponding to the feature word based on the feature word, the position information and the category from the information accumulation apparatus that accumulates the feature word classified by the category and the retrieval target corresponding to the feature word, the retrieval target corresponding to the feature word such that the POI indicated by the POI information is located within a predetermined range from the position, wherein the controller is further configured to extract a co-occurrence word that co-occurs from two or more words included in the retrieval phrase and replace the co-occurrence word with a retrieval word having a degree of similarity equal to or greater than a predetermined threshold value, to a word clustered in advance by each category.

6. The information retrieval system according to claim 5, wherein the information processing terminal comprises a display device to display the retrieval target retrieved by the controller.

7. The information retrieval system according to claim 6, wherein
the information processing terminal further comprises a terminal storage device to store map information, and
the display device displays a point corresponding to the retrieval target on a map represented by the map information.

8. The information retrieval system according to claim 5, wherein
the controller is configured to calculate statistical data of the retrieval phrase, and
the information accumulation apparatus associates the retrieval phrase acquired by the retrieval phrase acquisition device within a preset period with the statistical data.

9. The information retrieval system according to claim 8, wherein the controller is configured to determine the feature word of highest appearance frequency based on frequency information included in the statistical data.

10. The information retrieval system according to claim 5, wherein the information accumulation apparatus has an accumulation database generated based on review information acquired from an external information processing apparatus of outside.

11. An information retrieval method comprising:
generating a feature word from a retrieval phrase, the feature word being related to a word representing a retrieval target, the feature word corresponding with a feature vector that contains a degree of similarity of cosine equal to or greater than a predetermined threshold value, with a feature vector of distributed representation of the word representing the retrieval target;
acquiring a position information indicating a position on a map that is a starting point of retrieval, the retrieval target having a point of interest (POI) information indicating a point of interest (POI);
identifying the category based on whether a word included in the retrieval phrase matches the word stored in a retrieval storage device;
estimating, on a machine learning basis, the category from a word included in the retrieval phrase in a case where said category is not directly identified by the controller based on non-machine learning basis, using training data;
extracting a co-occurrence word that co-occurs from two or more words included in the retrieval phrase and replace the co-occurrence word with a retrieval word having a degree of similarity equal to or greater than a predetermined threshold value, to a word clustered in advance by each category; and
retrieving the retrieval target corresponding to the feature word based on the feature word, the position information and the category from an accumulation database that accumulates the feature word classified by the category and the retrieval target corresponding to the feature word, the retrieval target corresponding to the feature word such that the POI indicated by the POI information is located within a predetermined range from the position.

* * * * *